(12) United States Patent
Moon et al.

(10) Patent No.: US 11,339,616 B1
(45) Date of Patent: May 24, 2022

(54) ROBOT END-EFFECTOR ORIENTATION CONSTRAINT FOR PIPE TAILING PATH

(71) Applicant: NATIONAL OILWELL VARCO, L.P., Houston, TX (US)

(72) Inventors: Hyo Sang Moon, Houston, TX (US); Dominick Mancuso, Tomball, TX (US); Justin Benjamin Kinney, Katy, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 0 days.

(21) Appl. No.: 17/248,669

(22) Filed: Feb. 2, 2021

(51) Int. Cl.
*E21B 19/087* (2006.01)
*E21B 19/06* (2006.01)
*B25J 9/16* (2006.01)

(52) U.S. Cl.
CPC ........... *E21B 19/087* (2013.01); *B25J 9/1687* (2013.01); *E21B 19/06* (2013.01)

(58) Field of Classification Search
CPC ........ B25J 9/1612; B25J 13/085; B25J 13/08; B25J 19/06; B25J 9/1687; E21B 19/087; E21B 19/06
See application file for complete search history.

(56) References Cited

U.S. PATENT DOCUMENTS

| | | |
|---|---|---|
| 1,818,278 A | 8/1931 | Siler |
| 2,531,930 A | 11/1950 | Woolslayer et al. |
| 2,615,681 A | 10/1952 | True |
| 2,735,556 A | 2/1956 | Stone |
| 2,885,096 A | 5/1959 | De Jarnett |
| 2,946,464 A | 7/1960 | Guier |
| 3,225,949 A | 12/1965 | Erickson et al. |
| 3,272,365 A | 9/1966 | Stevens |
| 3,533,516 A | 10/1970 | Guier |
| 3,615,027 A | 10/1971 | Ham |
| 3,747,789 A | 7/1973 | Shipley et al. |
| 3,768,663 A | 10/1973 | Turner et al. |
| 3,840,128 A | 10/1974 | Swoboda et al. |
| 3,877,583 A | 4/1975 | Bokenkamp |
| 3,921,823 A | 11/1975 | Bourree et al. |

(Continued)

FOREIGN PATENT DOCUMENTS

| | | |
|---|---|---|
| CA | 2911388 A1 | 11/2014 |
| CA | 2855105 A1 | 12/2015 |

(Continued)

OTHER PUBLICATIONS

"U.S. Appl. No. 16/098,160, Final Office Action dated May 27, 2021", 8 pgs.

(Continued)

*Primary Examiner* — Gregory W Adams
(74) *Attorney, Agent, or Firm* — Schwegman Lundberg & Woessner, P.A.

(57) ABSTRACT

A pipe handling system for handling drill pipe may include a lifting system configured for handling a load of a pipe stand and a pipe handling robot configured for manipulating a position of the pipe stand. The robot may include an end effector configured for engaging the pipe stand. The system may also include a controller configured for controlling the pipe handling robot to maintain the end effector in substantial alignment with the pipe stand using a vector constraint.

15 Claims, 14 Drawing Sheets

(56) References Cited

U.S. PATENT DOCUMENTS

| | | | |
|---|---|---|---|
| 3,976,207 | A | 8/1976 | Schultz |
| 3,994,350 | A | 11/1976 | Smith et al. |
| 4,042,123 | A | 8/1977 | Sheldon et al. |
| 4,117,941 | A | 10/1978 | Mccleskey, Jr. et al. |
| 4,126,348 | A | 11/1978 | Palmer |
| 4,274,778 | A | 6/1981 | Putnam et al. |
| 4,289,442 | A | 9/1981 | Stevens |
| 4,348,920 | A | 9/1982 | Boyadjieff |
| 4,397,605 | A | 8/1983 | Cowgill et al. |
| 4,531,875 | A | 7/1985 | Krueger |
| 4,591,006 | A | 5/1986 | Hutchison et al. |
| 4,621,974 | A | 11/1986 | Krueger |
| 4,680,519 | A | 7/1987 | Chand et al. |
| 4,715,761 | A | 12/1987 | Berry et al. |
| 4,738,321 | A | 4/1988 | Olivier |
| 4,846,357 | A | 7/1989 | Sholl et al. |
| 4,899,095 | A * | 2/1990 | Kishi ............... G05B 19/4083 700/262 |
| 5,038,871 | A | 8/1991 | Dinsdale |
| 5,211,251 | A | 5/1993 | Woolslayer |
| 5,813,286 | A | 9/1998 | Hansen |
| 5,921,329 | A | 7/1999 | Armstrong |
| 6,047,771 | A | 4/2000 | Roeynestad |
| 6,260,646 | B1 | 7/2001 | Fernandez et al. |
| 6,412,576 | B1 | 7/2002 | Meiners |
| 7,137,616 | B2 | 11/2006 | Kysely |
| 7,249,639 | B2 | 7/2007 | Belik |
| 7,370,707 | B2 | 5/2008 | Mcdaniel et al. |
| 7,726,929 | B1 | 6/2010 | Orgeron |
| 7,905,311 | B2 | 3/2011 | Brown |
| 7,946,795 | B2 | 5/2011 | Orgeron |
| 7,984,757 | B1 | 7/2011 | Keast et al. |
| 8,074,484 | B2 | 12/2011 | Denkmeier et al. |
| 8,191,637 | B2 | 6/2012 | Havinga |
| 8,210,269 | B2 | 7/2012 | Hudson et al. |
| 8,317,448 | B2 | 11/2012 | Hankins et al. |
| 8,504,206 | B2 * | 8/2013 | Fudaba .................... B25J 3/04 700/260 |
| 8,550,761 | B2 | 10/2013 | Belik et al. |
| 8,690,508 | B1 | 4/2014 | Orgeron |
| 9,291,010 | B1 | 3/2016 | Barnes |
| 10,047,908 | B1 | 8/2018 | Bohle, II et al. |
| 10,053,934 | B2 | 8/2018 | Keogh et al. |
| 10,384,907 | B2 | 8/2019 | Upmeler |
| 10,794,126 | B2 | 10/2020 | Magnuson |
| 10,995,564 | B2 | 5/2021 | Miller et al. |
| 11,035,183 | B2 | 6/2021 | Donnally et al. |
| 2003/0159854 | A1 | 8/2003 | Simpson et al. |
| 2004/0057815 | A1 | 3/2004 | Woolslayer et al. |
| 2005/0055132 | A1 * | 3/2005 | Matsumoto ............ B25J 9/1682 700/245 |
| 2005/0113971 | A1 * | 5/2005 | Zhang ................... B25J 9/1687 700/245 |
| 2005/0126792 | A1 | 6/2005 | Berry |
| 2006/0081379 | A1 | 4/2006 | Fehres et al. |
| 2006/0104747 | A1 | 5/2006 | Zahn et al. |
| 2006/0124316 | A1 | 6/2006 | Pietras |
| 2006/0231344 | A1 | 10/2006 | Drzewiecki |
| 2006/0249292 | A1 | 11/2006 | Guidry |
| 2007/0062705 | A1 | 3/2007 | Schats et al. |
| 2007/0114069 | A1 | 5/2007 | Hooper et al. |
| 2007/0228671 | A1 | 10/2007 | Norton |
| 2008/0136203 | A1 | 6/2008 | Krijnen et al. |
| 2008/0202812 | A1 | 8/2008 | Childers et al. |
| 2008/0238095 | A1 | 10/2008 | Yater et al. |
| 2008/0296065 | A1 | 12/2008 | Standal |
| 2009/0283324 | A1 | 11/2009 | Konduc et al. |
| 2010/0163247 | A1 | 7/2010 | Wright et al. |
| 2010/0193198 | A1 | 8/2010 | Murray et al. |
| 2010/0303586 | A1 | 12/2010 | Hankins et al. |
| 2011/0079434 | A1 | 4/2011 | Belik et al. |
| 2011/0120730 | A1 | 5/2011 | Clasen et al. |
| 2011/0226485 | A1 | 9/2011 | Seneviratne et al. |
| 2012/0018222 | A1 | 1/2012 | Hankins et al. |
| 2012/0259337 | A1 | 10/2012 | Del Rio et al. |
| 2013/0075114 | A1 | 3/2013 | Dekker et al. |
| 2013/0142607 | A1 | 6/2013 | Ditzler |
| 2014/0054089 | A1 | 2/2014 | Sondervik |
| 2014/0097027 | A1 | 4/2014 | Marica et al. |
| 2014/0145408 | A1 | 5/2014 | Midas et al. |
| 2014/0202769 | A1 | 7/2014 | Magnuson |
| 2015/0053424 | A1 | 2/2015 | Wiens et al. |
| 2015/0127152 | A1 * | 5/2015 | Nammoto ............. B25J 13/085 700/253 |
| 2015/0148952 | A1 * | 5/2015 | Shiratsuchi ........... B25J 9/0084 700/248 |
| 2015/0232272 | A1 | 8/2015 | Magnuson |
| 2015/0272579 | A1 | 10/2015 | Leimbach et al. |
| 2015/0273688 | A1 * | 10/2015 | Harada .................. B25J 9/1697 700/259 |
| 2015/0275596 | A1 | 10/2015 | Hickie |
| 2015/0283704 | A1 * | 10/2015 | Watanabe ............. B25J 9/1697 700/259 |
| 2015/0330162 | A1 | 11/2015 | Magnuson et al. |
| 2016/0060979 | A1 | 3/2016 | Magnuson |
| 2016/0115745 | A1 | 4/2016 | Bisel |
| 2016/0145954 | A1 | 5/2016 | Helms et al. |
| 2016/0160586 | A1 | 6/2016 | Keogh et al. |
| 2016/0168929 | A1 | 6/2016 | Magnuson et al. |
| 2016/0201408 | A1 | 7/2016 | Little et al. |
| 2017/0172295 | A1 | 6/2017 | Tropper |
| 2017/0204687 | A1 | 7/2017 | Yorga et al. |
| 2017/0232620 | A1 | 8/2017 | Kalb et al. |
| 2017/0234088 | A1 | 8/2017 | Orr et al. |
| 2018/0245408 | A1 | 8/2018 | Keogh et al. |
| 2018/0328112 | A1 * | 11/2018 | Berry ..................... E21B 19/08 |
| 2018/0334865 | A1 | 11/2018 | Miller et al. |
| 2019/0017334 | A1 | 1/2019 | Loeyning et al. |
| 2019/0143532 | A1 * | 5/2019 | Cutkosky ............... B25J 15/008 294/212 |
| 2019/0145197 | A1 | 5/2019 | Callaghan |
| 2019/0309585 | A1 | 10/2019 | Miller et al. |
| 2019/0352982 | A1 | 11/2019 | Arefi et al. |
| 2020/0032597 | A1 * | 1/2020 | Jorgic .................. E21B 19/164 |
| 2020/0040673 | A1 | 2/2020 | Donnally et al. |
| 2020/0040674 | A1 | 2/2020 | Mckenzie et al. |
| 2021/0246738 | A1 | 8/2021 | Mckenzie et al. |
| 2021/0293099 | A1 | 9/2021 | Carnegie et al. |
| 2021/0301602 | A1 | 9/2021 | Mckenzie et al. |

FOREIGN PATENT DOCUMENTS

| | | | |
|---|---|---|---|
| CN | 108266139 A | | 7/2018 |
| CN | 110792399 A | | 2/2020 |
| EP | 1953334 A2 | | 8/2008 |
| GB | 2091788 A | | 8/1982 |
| GB | 2532267 A | | 5/2016 |
| JP | H09-137689 A | | 5/1997 |
| NO | 20151648 A1 | | 12/2015 |
| WO | WO-88/00274 A2 | | 1/1988 |
| WO | WO-99/58811 A1 | | 11/1999 |
| WO | WO-01/23701 A1 | | 4/2001 |
| WO | WO-2004/018829 A1 | | 3/2004 |
| WO | WO-2013/082172 A1 | | 6/2013 |
| WO | WO-2014/179730 A1 | | 11/2014 |
| WO | WO-2015/043740 A1 | | 4/2015 |
| WO | WO-2016/024859 A1 | | 2/2016 |
| WO | WO-2016/197255 A1 | | 12/2016 |
| WO | WO-2017/039996 A1 | | 3/2017 |
| WO | WO-2017/087595 A1 | | 5/2017 |
| WO | WO-2017/190120 A1 | | 11/2017 |
| WO | WO-2017/193204 A1 | | 11/2017 |
| WO | WO-2019/195651 A1 | | 10/2019 |
| WO | WO-2020/028852 A1 | | 2/2020 |
| WO | WO-2020/028853 A1 | | 2/2020 |
| WO | WO-2020/028853 A9 | | 2/2020 |
| WO | WO-2020/028856 A1 | | 2/2020 |
| WO | WO-2020/028858 A1 | | 2/2020 |
| WO | WO-2020/151386 A1 | | 7/2020 |
| WO | WO-2020/172407 A1 | | 8/2020 |
| WO | 2021203122 | | 10/2021 |

(56) References Cited

FOREIGN PATENT DOCUMENTS

| WO | 2021226622 | 11/2021 |
|----|------------|---------|
| WO | 2022016168 | 1/2022  |

OTHER PUBLICATIONS

"U.S. Appl. No. 16/836,365, Final Office Action dated May 4, 2021", 7 pgs.
"U.S. Appl. No. 16/836,365, Response filed Apr. 22, 21 to Non Final Office Action dated Jan. 25, 2021", 8 pgs.
"U.S. Appl. No. 16/836,365, Response filed Jul. 2, 2021 to Final Office Action dated May 4, 2021", 7 pgs.
"International Application Serial No. PCT/US2021/0/0319, International Search Report dated May 31, 2021", 5pgs.
"International Application Serial No. PCT/US2021/070319, Written Opinion dated May 31, 2021", 6 pgs.
"International Application Serial No. PCT/US2021/070488, Invitation to Pay Additional Fees dated Jun. 28, 2021", 2 pgs.
"U.S. Appl. No. 16/098,160, Advisory Action dated Jul. 22, 2020", 5 pgs.
"U.S. Appl. No. 16/098,160, Examiner Interview Summary dated Jun. 23, 2020", 3 pgs.
"U.S. Appl. No. 16/098,160, Final Office Action dated Apr. 30, 2020", 7 pgs.
"U.S. Appl. No. 16/098,160, Non Final Office Action dated Sep. 30, 2019", 8 pgs.
"U.S. Appl. No. 16/098,160, Non Final Office Action dated Oct. 6, 2020", 8 pgs.
"U.S. Appl. No. 16/098,160, Preliminary Amendment filed Nov. 1, 2018", 5 pgs.
"U.S. Appl. No. 16/098,160, Response filed Jan. 6, 2021 to Non Final Office Action dated Oct. 6, 2020", 7 pgs.
"U.S. Appl. No. 16/098,160, Response filed Jan. 30, 2020 to Non Final Office Action dated Sep. 30, 2019", 8 pgs.
"U.S. Appl. No. 16/098,160, Response filed Jun. 30, 2020 to Final Office Action dated Apr. 30, 2020", 8 pgs.
"U.S. Appl. No. 16/098,160, Response filed Aug. 24, 2020 to Advisory Action dated Jul. 22, 2020", 9 pgs.
"U.S. Appl. No. 16/375,927, Advisory Action dated Aug. 11, 2020", 6 pgs.
"U.S. Appl. No. 16/375,927, Corrected Notice of Allowability dated Jan. 26, 2021", 2 pgs.
"U.S. Appl. No. 16/375,927, Examiner Interview Summary dated Apr. 24, 2020", 3 pgs.
"U.S. Appl. No. 16/375,927, Examiner Interview Summary dated Dec. 7, 2020", 7 pgs.
"U.S. Appl. No. 16/375,927, Final Office Action dated Jun. 5, 2020", 10 pgs.
"U.S. Appl. No. 16/375,927, Non Final Office Action dated Feb. 28, 2020", 9 pgs.
"U.S. Appl. No. 16/375,927, Non Final Office Action dated Sep. 24, 2020", 10 pgs.
"U.S. Appl. No. 16/375,927, Notice of Allowance dated Jan. 1, 2021", 8 pgs.
"U.S. Appl. No. 16/375,927, Response filed May 27, 2020 to Non Final Office Action dated Feb. 28, 2020", 10 pgs.
"U.S. Appl. No. 16/375,927, Response filed Aug. 3, 2020 to Final Office Action dated Jun. 5, 2020", 11 pgs.
"U.S. Appl. No. 16/375,927, Response filed Sep. 8, 2020 to Advisory Action dated Aug. 11, 2020", 10 pgs.
"U.S. Appl. No. 16/375,927, Response filed Dec. 16, 2020 to Non Final Office Action dated Sep. 24, 2020", 8 pgs.
"U.S. Appl. No. 16/431,540, Examiner Interview Summary dated Jan. 19, 2021", 3 pgs.
"U.S. Appl. No. 16/431,540, Final Office Action dated Nov. 19, 2020", 10 pgs.
"U.S. Appl. No. 16/431,540, Non Final Office Action dated Jun. 10, 2020", 13 pgs.
"U.S. Appl. No. 16/431,540, Notice of Allowance dated Feb. 11, 2021", 5 pgs.
"U.S. Appl. No. 16/431,540, Response filed Jan. 19, 2021 to Final Office Action dated Nov. 19, 2020", 11 pgs.
"U.S. Appl. No. 16/431,540, Response Filed Sep. 10, 2020 to Non Final Office Action dated Jun. 10, 2020", 24 pgs.
"U.S. Appl. No. 16/431,540, Supplemental Notice of Allowability dated Mar. 11, 2021", 2 pgs.
"U.S. Appl. No. 16/836,365, Non Final Office Action dated Jan. 25, 2021", 8 pgs.
"Canadian Application Serial No. 3,022,888, Voluntary Amendment filed Jul. 12, 2019", 10 pgs.
"International Application Serial No. PCT/CA2017/000125, International Preliminary Report on Patentability dated Nov. 22, 2018", 6 pgs.
"International Application Serial No. PCT/CA2017/000125, International Search Report dated Aug. 14, 2017", 3 pgs.
"International Application Serial No. PCT/CA2017/000125, Written Opinion dated Aug. 14, 2017", 4 pgs.
"International Application Serial No. PCT/CN2019/124443, International Search Report dated Mar. 5, 2020", 4 pgs.
"International Application Serial No. PCT/CN2019/124443, Written Opinion dated Mar. 5, 2020", 4 pgs.
"International Application Serial No. PCT/US2019/025942, International Preliminary Report on Patentability dated Oct. 30, 2020", 7 pgs.
"International Application Serial No. PCT/US2019/025942, International Search Report dated Jun. 27, 2019", 4 pgs.
"International Application Serial No. PCT/US2019/025942, Response filed Feb. 5, 2020 to Written Opinion dated Feb. 27, 2019", 14 pgs.
"International Application Serial No. PCT/US2019/025942, Response filed Apr. 23, 2020 to Written Opinion dated Apr. 23, 2020", 14 pgs.
"International Application Serial No. PCT/US2019/025942, Response filed Sep. 22, 2020 to Written Opinion dated Jul. 23, 2020", 4 pgs.
"International Application Serial No. PCT/US2019/025942, Written Opinion dated Feb. 24, 2020", 8 pgs.
"International Application Serial No. PCT/US2019/025942, Written Opinion dated Jun. 27, 2019", 9 pgs.
"International Application Serial No. PCT/US2019/025942. Written Opinion dated Jul. 23, 2020", 5 pgs.
"International Application Serial No. PCT/US2019/044974, International Preliminary Report on Patentability dated Nov. 11, 2020", 7 pgs.
"International Application Serial No. PCT/US2019/044974, International Search Report dated Oct. 24, 2019", 6 pgs.
"International Application Serial No. PCT/US2019/044974, Response filed Jun. 2, 2020 to Written Opinion dated Oct. 24, 2019", 13 pgs.
"International Application Serial No. PCT/US2019/044974, Response filed Aug. 18, 2020 to Written Opinion dated Jun. 19, 2020", 4 pgs.
"International Application Serial No. PCT/US2019/044974, Written Opinion dated Jun. 19, 2020", 7 pgs.
"International Application Serial No. PCT/US2019/044974, Written Opinion dated Oct. 24, 2019", 6 pgs.
"International Application Serial No. PCT/US2019/044976, International Search Report dated Oct. 18, 2019", 5 pgs.
"International Application Serial No. PCT/US2019/044976, Response filed Jun. 3, 2020 to Written Opinion dated Oct. 18, 2019", 11 pgs.
"International Application Serial No. PCT/US201 9/044976, Response filed Aug. 25, 2020 to Written Opinion dated Jun. 26, 2020", 3 pgs.
"International Application Serial No. PCT/US2019/044976, Written Opinion dated Jun. 26, 2020", 4 pgs.
"International Application Serial No. PCT/US2019/044976, Written Opinion dated Oct. 18, 2019", 8 pgs.
"International Application Serial No. PCT/US2019/044976, Written Opinion dated Nov. 6, 2020", 6 pgs.
"International Application Serial No. PCT/US2019/044979, International Preliminary Report on Patentability dated Nov. 18, 2020", 7 pgs.
"International Application Serial No. PCT/US2019/044979, International Search Report dated Oct. 22, 2019", 6 pgs.
"International Application Serial No. PCT/US2019/044979, Response filed Jun. 3, 2020 to Written Opinion dated Oct. 22, 2019", 12 pgs.

(56) References Cited

OTHER PUBLICATIONS

"International Application Serial No. PCT/US2019/044979, Response filed Aug. 25, 2020 to Written Opinion dated Jun. 26, 2020", 3 pgs.
"International Application Serial No. PCT/US201 9/044979, Written Opinion dated Jun. 26, 2020", 4 pgs.
"International Application Serial No. PCT/US2019/044979, Written Opinion dated Oct. 22, 2019", 7 pgs.
"International Application Serial No. PCT/US2019/044983, International Preliminary Report on Patentability dated Feb. 18, 2021", 8 pgs.
"International Application Serial No. PCT/US2019/044983, International Search Report dated Oct. 22, 2019", 5 pgs.
"International Application Serial No. PCT/US2019/044983, Written Opinion dated Oct. 22, 2019", 6 pgs.
"International Application Serial No. PCT/US2019/124443, Response filed Nov. 24, 2020 to Written Opinion dated Mar. 5, 2020", 10 pgs.
"International Application Serial No. PCT/US2020/019039, International Search Report dated May 15, 2020", 2 pgs.
"International Application Serial No. PCT/US2020/019039, Written Opinion dated May 15, 2020", 4 pgs.
"Moveit—Kinematic constraints: Visibility Constraint Class Reference", [online], [retrieved Apr. 21, 2021], Retrieved from the Internet: <URL: http://docs.ros.org/en/hydro/api/moveit_core/html/classkinematic_constraints_1_1VisibilityConstraint.html>, (2021), 8 pgs.
"Moveit—Moving robots into the future", [online], [archived Dec. 4, 2020]. Retrieved from the Internet: <URL: https://web.archive.org/web/20201204224545/https://moveit.ros.org/>, (2020), 7 pgs.
U.S. Appl. No. 16/098,169, filed Nov. 1, 2018, System and Method for Offline Standbuilding.
U.S. Appl. No. 16/375,927 10,995,564, filed Apr. 5, 2019, System for Handling Tubulars on a Rig.
U.S. Appl. No. 16/431,533, filed Jun. 4, 2019, Devices, Systems, and Methods for Robotic Pipe Handling.
U.S. Appl. No. 17/250,548, filed Feb. 2, 2021, End Effectors for Automated Pipe Handling.
U.S. Appl. No. 16/431,540, filed Jun. 4, 2019, Devices, Systems, and Methods for Top Drive Clearing.
U.S. Appl. No. 16/786,345, filed Feb. 10, 2020, Quick Coupling Drill Pipe Connector.
"U.S. Appl. No. 16/836,365, Notice of Allowance dated Jul. 27, 2021", 7 pgs.
"U.S. Appl. No. 16/098,160, Response filed Jul. 27, 2021 to Final Office Action dated May 27, 2021", 9 pgs.
"International Application Serial No. PCT/CN2019/124443, International Preliminary Report on Patentability dated May 26, 2021", 4 pgs.
"U.S. Appl. No. 16/098,160, Advisory Action dated Aug. 10, 2021", 4 pgs.
"U.S. Appl. No. 16/098,160, Response filed Aug. 27, 2021 to Advisory Action dated Aug. 10, 2021", 8 pgs.
"International Application Serial No. PCT/US2020/019039, International Preliminary Report on Patentability dated Sep. 2, 2021", 6 pgs.
"International Application Serial No. PCT/US2021/070786, Invitation to Pay Additional Fees dated Sep. 1, 2021", 2 pgs.
"International Application Serial No. PCT/US2021/070488, International Search Report dated Sep. 8, 2021", 4 pgs.
"International Application Serial No. PCT/US2021/070488, Written Opinion dated Sep. 8, 2021", 6 pgs.
"U.S. Appl. No. 16/098,160, Non-Final Office Action dated Sep. 15, 2021", 8 pgs.
"U.S. Appl. No. 16/836,365, Notice of Allowance dated Nov. 3, 2021", 7 pgs.
"International Application Serial No. PCT/US2021/070786, International Search Report dated Nov. 9, 2021", 4 pgs.
"International Application Serial No. PCT/US2021/070786, Written Opinion dated Nov. 9, 2021", 7 pgs.
"U.S. Appl. No. 16/098,160, Response filed Dec. 14, 2021 to Non-Final Office Action dated Sep. 15, 2021", 8 pgs.

\* cited by examiner

ROBOT END-EFFECTOR ORIENTATION CONSTRAINT FOR PIPE TAILING PATH

TECHNOLOGICAL FIELD

The present disclosure relates to drill pipe handling operations. In particular, the present disclosure relates to handling drill pipe with robots. More particularly, the present disclosure relates to control schemes for pipe handling devices or end effectors on the robots.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Drilling of wells involves tripping of the drill string, during which drill pipes are lowered into (tripping in) or pulled out of (tripping out) a well. Tripping may typically occur in order to change all or a portion of the bottom hole assembly, such as to change a drill bit. Where drill pipe is tripped into a well, stands or lengths of drill pipe may be supplied from a storage position in a setback area of the drill rig and connected end-to-end to lengthen the drill string in the well. Where drill pipe is tripped out of a well, stands or lengths of drill pipe may be disconnected from the drill string and may be positioned in the setback area.

Tripping has conventionally been performed with human operators. In particular, while an elevator or top drive may be used to carry the load of a stand of drill pipe during trip in and trip out operations, human operators may typically maneuver the drill pipe stands around the drill floor, such as between the well center and the setback area. For example, a first human operator may be positioned on the drill floor, at or near the well, to maneuver a lower end of drill pipe stands as they are tripped into or out of the well, while a second human operator may be positioned on or above the racking board to maneuver an upper end of drill pipe stands as the stands are moved between the well and the setback area. Operators often use ropes and/or other tools to maneuver the drill pipe stands on or above the drill floor. Such work is labor-intensive and can be dangerous. Moreover, trip in and trip out operations may be limited by the speed at which the human operators can maneuver the stands between well center and the setback area.

BRIEF SUMMARY OF THE INVENTION

The following presents a simplified summary of one or more embodiments of the present disclosure in order to provide a basic understanding of such embodiments. This summary is not an extensive overview of all contemplated embodiments and is intended to neither identify key or critical elements of all embodiments, nor delineate the scope of any or all embodiments.

In one or more embodiments, a pipe handling system for handling drill pipe may include a lifting system configured for handling a load of a pipe stand and a pipe handling robot configured for manipulating a position of the pipe stand. The pipe handling robot may include an end effector configured for engaging the pipe stand. The system may also include a controller configured for controlling the pipe handling robot to maintain the end effector in substantial alignment with the pipe stand using a vector constraint.

In one or more embodiments, a pipe handling robot may include a plurality of moveable components including an end effector configured for engaging a pipe. The end effector may define a working plane and a local longitudinal axis that extends perpendicular to the working plane. The pipe handling robot may also include a controller configured for controlling the pipe handling robot to maintain the end effector in substantial alignment with the pipe stand using a vector constraint.

In one or more embodiments, a method of tripping pipe may include supporting drill pipe by suspending the drill pipe at a first top end with an elevator or resting the drill pipe at a first bottom end on the drill floor. The method may also include, with an end effector of a robot, engaging the drill pipe at a second end opposite the first top end or the first bottom end. The method may also include controlling the robot to move the second end to or from well center from or to a setback area, respectively; while using a vector constraint to maintain a longitudinal vector of the end effector substantially parallel to the drill pipe.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure, in one or more embodiments, relates to systems and methods for automated drill pipe handling operations. A pipe handling system of the present disclosure may include a lifting system and one or more drill pipe handling robots and may be configured for performing trip in, trip out, stand building, and/or other drill pipe or drill collar handling operations. In particular, the drill pipe handling robots may include end effectors adapted to maintain an orientation that is consistent with the orientation of the drill pipe as the pipe is moved about the drill floor. The end effectors may do so by relying an orientation constraint. Maintaining the end effector orientation consistent with the drill pipe orientation allows for consistent engagement with the drill pipe and avoids imparting longitudinal drill pipe loads on the end effector and, consequently, the drill pipe handling robot. This is advantageous because it allows for more efficient selection of drill pipe handling robots by avoiding a need to select more robust robots that may be capable of lifting and/or carrying the drill pipe loads.

Figure 1:
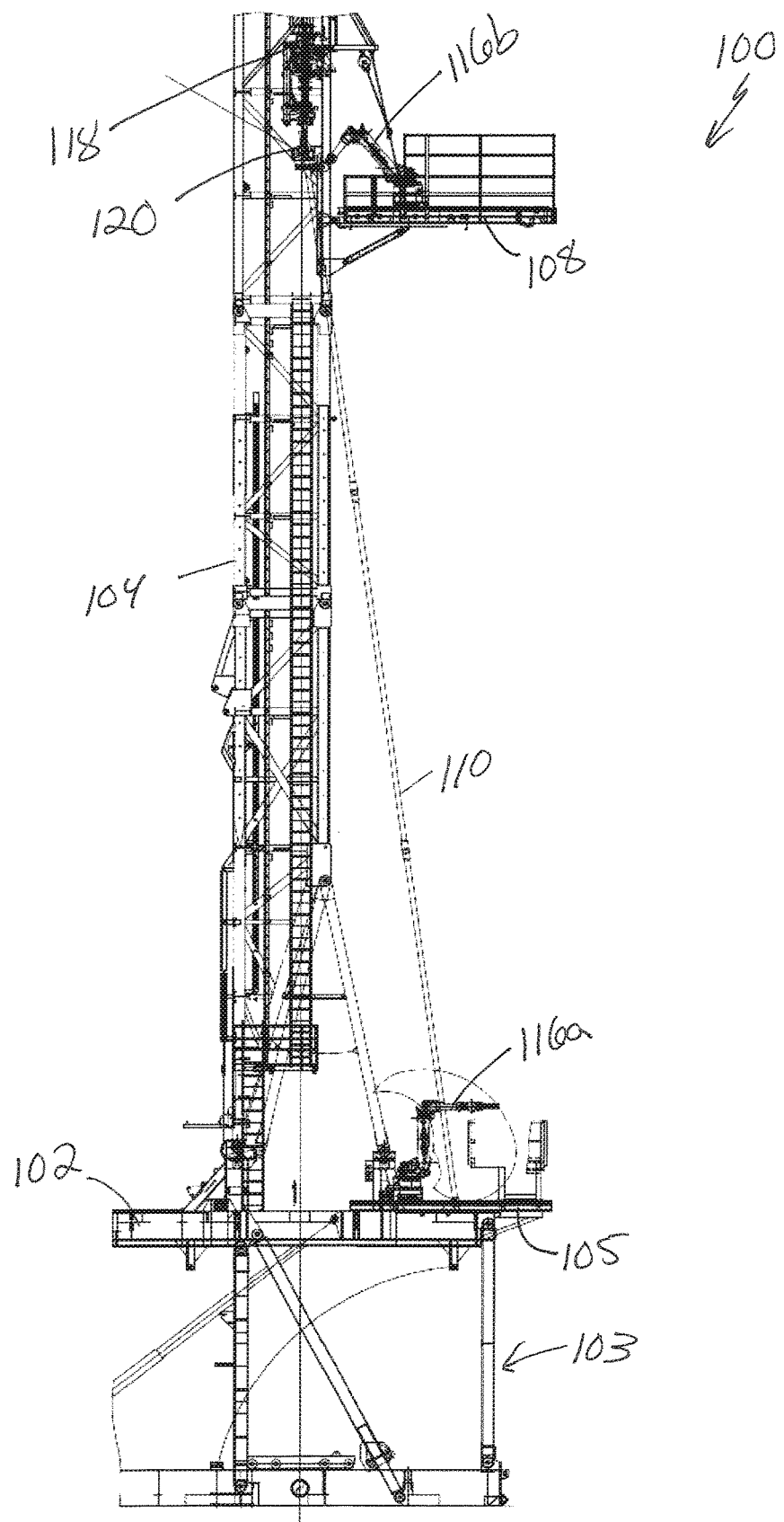
FIG. 1 is a side view of a drill rig having a drill pipe handling system of the present disclosure, according to one or more embodiments.

Turning now to FIG. 1, a drilling rig 100 of the present disclosure is shown. The drilling rig 100 may be configured for onshore oil drilling in some embodiments. However, in other embodiments, other drilling rigs of the present disclosure may be configured for other drilling operations, including offshore drilling. The drilling rig 100 may be configured to be a mobile or stationary rig. The drilling rig 100 may generally have a drill floor 102, a mast 104, and a pipe handling system.

The drill floor 102 may include a platform positioned above or over a well and supported by a substructure 103. The drill floor 102 may be configured to provide a working space for drilling operations and/or a storage space for equipment and drill pipe. The drill floor 102 may have an opening arranged at or near well center for accessing the well during drilling operations. The drill floor 102 may additionally include a setback area 105 configured for receiving and/or storing lengths of drill pipe. For example, lengths of drill pipe may be stored as single stands, or may be combined into double stands, triple stands, quadruple stands, or other sized stands 110, and positioned on end in the setback area 105.

The mast 104 may extend from the drill floor with a height suitable for accommodating and/or building single, double, triple, quadruple, or other sized drill pipe stands. For example, the mast 104 may have a height of up to 50 feet, 100 feet 150 feet, 200 feet, or more. In other embodiments, the mast 104 may have any other suitable height or height range. In some embodiments, a racking board 108 may extend from the mast 104 and be arranged generally above the setback area 105. The racking board 108 may be configured for managing the top portion of pipe stands to maintain or store stands of pipe in a generally organized manner. In some embodiments, pipe stands 110 may be stored with a first or lower end arranged on the drill floor 102 in the setback area 105, and a second end or upper end extending in or through a racking board 108. The racking board 108 may extend laterally from the mast 104 at height of between approximately 30 feet and approximately 200 feet from a ground or pad surface, or between approximately 40 feet and approximately 150 feet, or between approximately 50 feet and approximately 100 feet. In other embodiments, the racking 108 board may extend from the mast 104 at any other suitable height.

Figure 2:
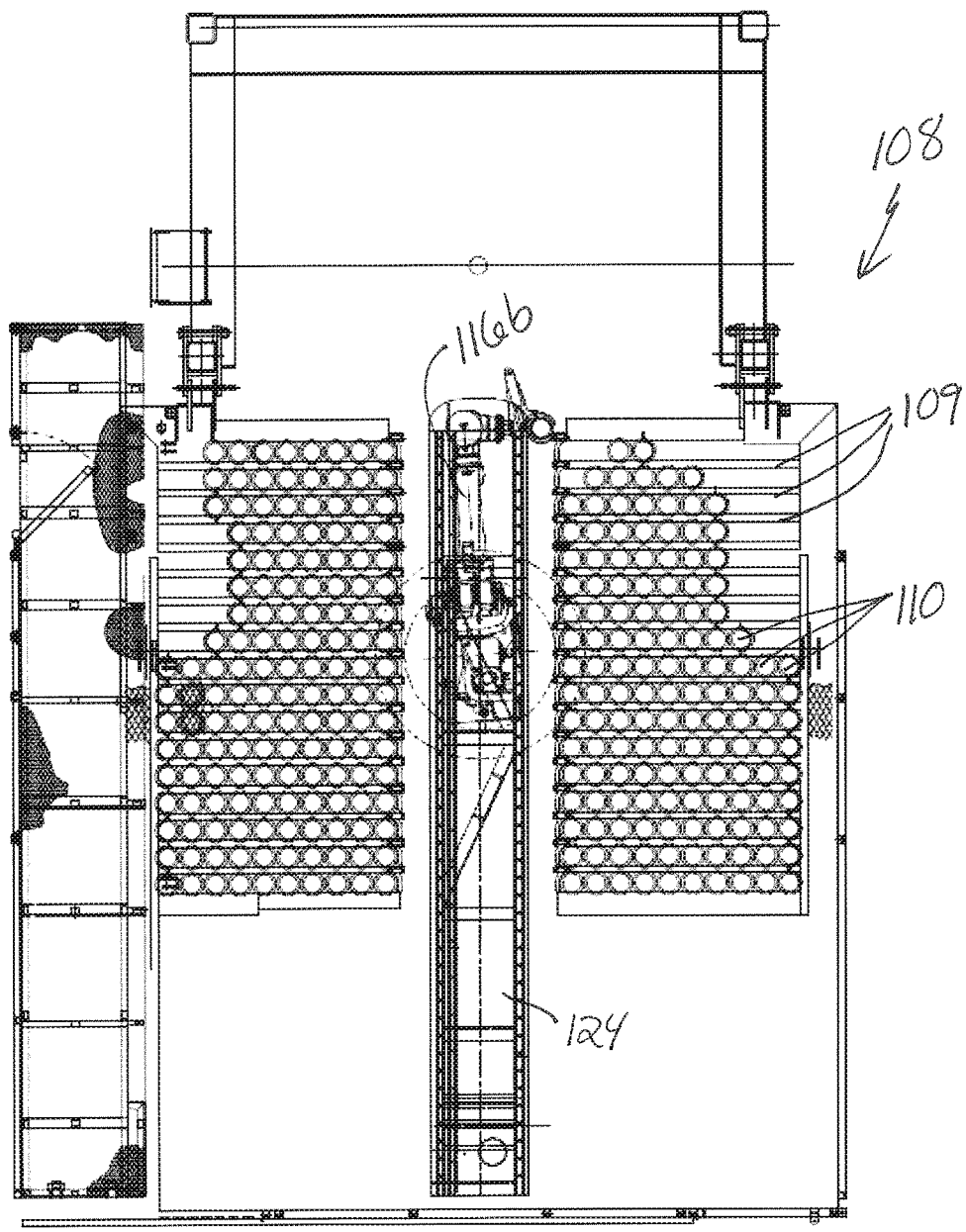
FIG. 2 is an overhead view of a racking board of the present disclosure, according to one or more embodiments.

FIG. 2 shows an overhead view of a racking board 108, according to some embodiments. The racking board 108 may include a plurality of fingers 109, which may be arranged in a parallel configuration, configured to receive stands 110 of pipe therebetween so as to maintain the pipe stands in an upright, on-end configuration. The fingers 109 of the racking board 108 may operate to maintain stands of pipe in organized rows or columns. In particular, the racking board 108 may be configured such that a plurality of pipe stands 110 may be arranged in a row or column between each pair of racking board fingers 109. In some embodiments, pipe stands 110 may be added to the racking board 108 as they are built. The racking board 108 may store the pipe stands 110 until they are added to a drill string during a trip in operation. Moreover, during a trip out operation, pipe stands 110 may be removed from the drill string and added to the racking board 108 until they are either tripped back into the well or disassembled. The racking board 108 may additionally or alternatively be configured to store pipe stands 110 during other operations as well.

With reference back to FIG. 1, the drilling rig may additionally include a pipe handling system. The pipe handling system may be configured for manipulating and moving lengths or stands of pipe, such as for trip in and trip out operations, stand building, and/or other operations. The pipe handling system may include a lifting system, a pipe coupling mechanism 114, and one or more robots or robotic handlers 116.

Figure 3:
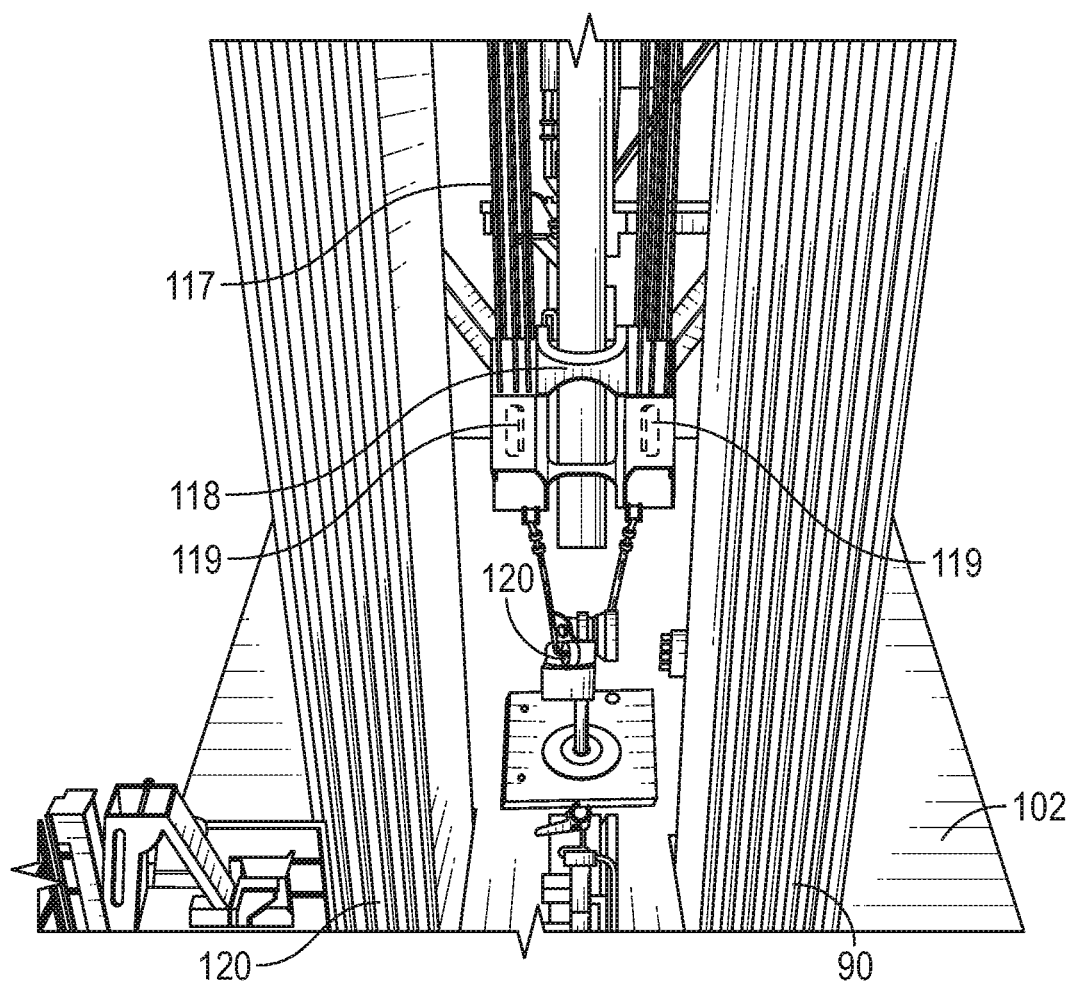
FIG. 3 is a close-up side view of a traveling block and a pipe elevator of the present disclosure, according to one or more embodiments.

The lifting system may be configured for supporting the load of a pipe stand 110 and/or drill string during a trip in, trip out, and/or other pipe handling operation. For example, the lifting system may be configured to support a pipe stand load as robots 116 or operators maneuver the pipe stand 110 between a racking board 108 and a well center. The lifting system may include a drill line or cable extending from a draw works. The drill line may be reeved between a crown block, arranged at or near a top of the mast 104, and a traveling block 118, arranged beneath the crown block and within the mast. In some embodiments, the drill line may be a main or primary line that may be otherwise configured for use during drilling operations using a top drive, for example. A pipe elevator 120 configured for coupling to a drill pipe may extend from the traveling block 118. In some embodiments, the pipe elevator 120 may be incorporated into a top drive, which may be coupled to the traveling block 118 via a hook dolly or the pipe elevator 120 may be more directly coupled to the traveling block 118 via a hook dolly. In either case, the traveling block 118 may be configured to raise and lower the pipe elevator 120, so as to raise and lower a length or stand of pipe 110, between the drill floor 102 and the crown block. FIG. 3 shows a close-up view of the traveling block 118 arranged on the main drill line 117, and the pipe elevator 120 extending from the traveling block. As shown, the traveling block 118 may include one or more sheaves 119 through which the main drill line 117 may be reeved.

The pipe handling system may include one or more mechanisms for coupling and/or decoupling lengths of drill pipe. In particular and with reference to FIG. 4, one or more iron roughnecks 114 may be arranged on the drill floor 102. For example, an iron roughneck 114 may be arranged on the drill floor 102 near well center, and may be configured to reach drill pipe stands 110 above or on the drill floor. The iron roughneck may be configured to couple stands 110 of drill pipe together to form the drill string, such as during a trip in operation, and/or may be configured to decouple stands of drill pipe from the drill string, such as during a trip out operation. The iron roughneck 114 may additionally operate to couple lengths of drill pipe together to form a pipe stand 110, and/or to decouple lengths of pipe to deconstruct a stand. The iron roughneck 114 may generally have static and torque wrenches configured to screw together pipe lengths with threaded ends. In other embodiments, the pipe handling system may include additional or alternative pipe coupling devices or mechanisms.

Each robot 116 (e.g., racking board robot and drill floor robot) may be configured to manipulate drill pipe lengths or stands 110, drill collar, and/or other piping. The robots 116 may each be programmable for carrying out particular sequences of operations. A handling system 106 may have one, two, three, four, or any other suitable number of robots 116. For example, a pipe handling system of the present disclosure may include a first robot 116a arranged on or near the drill floor 102, and a second robot 116b arranged on or near the racking board 108. In some embodiments, two robots 116 may be generally aligned with one another. For example, the racking board robot 116b may be centrally arranged on a racking board 108, and the drill floor robot 116a may be positioned in a setback area 105 of the drill floor 102 beneath and generally aligned with the racking board robot. In other embodiments, robots 116 may be positioned differently, but may generally be arranged in corresponding configurations. In some embodiments, robots 116 may be arranged in corresponding pairs, with an upper or racking board robot 116b configured to handle an upper end of piping and a corresponding lower or drill floor robot 116a configured to handle a lower end of piping. In one or more embodiments, multiple drill floor robots 116a and/or racking board robots 116b may be provided.

Figure 4A:
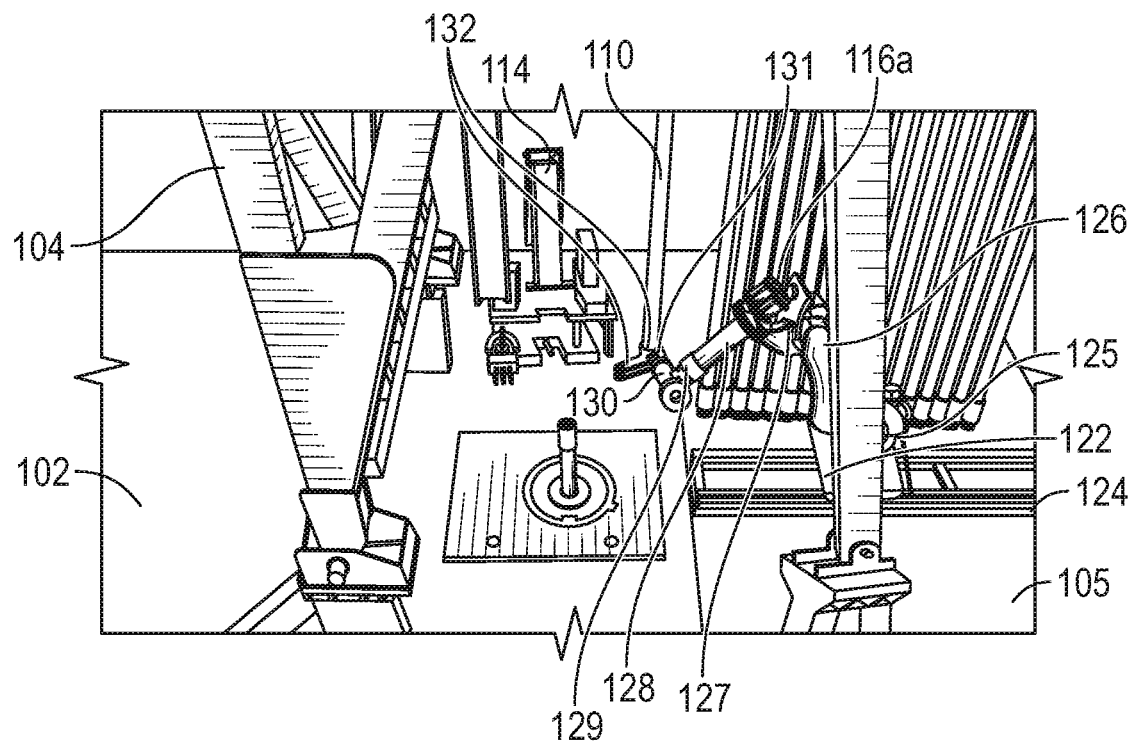
FIG. 4A is a side view of a pipe handling robot of the present disclosure arranged on a drill floor, according to one or more embodiments.
Figure 4B:
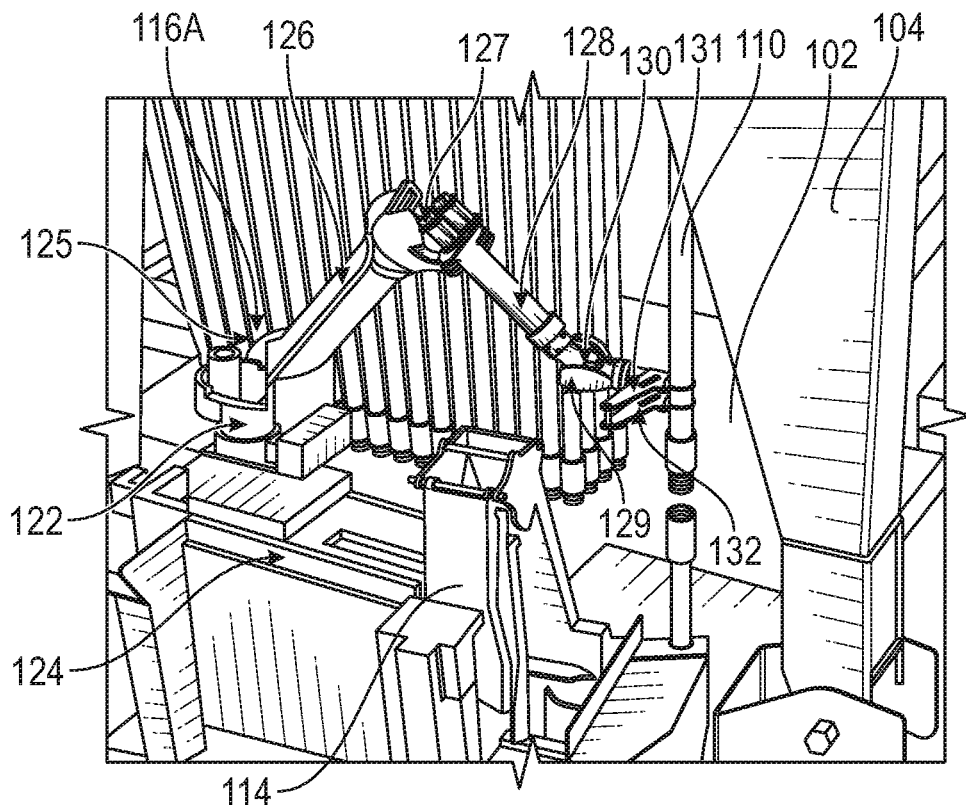
FIG. 4B is another side view of the pipe handling robot of FIG. 4A, according to one or more embodiments.
Figure 5A:
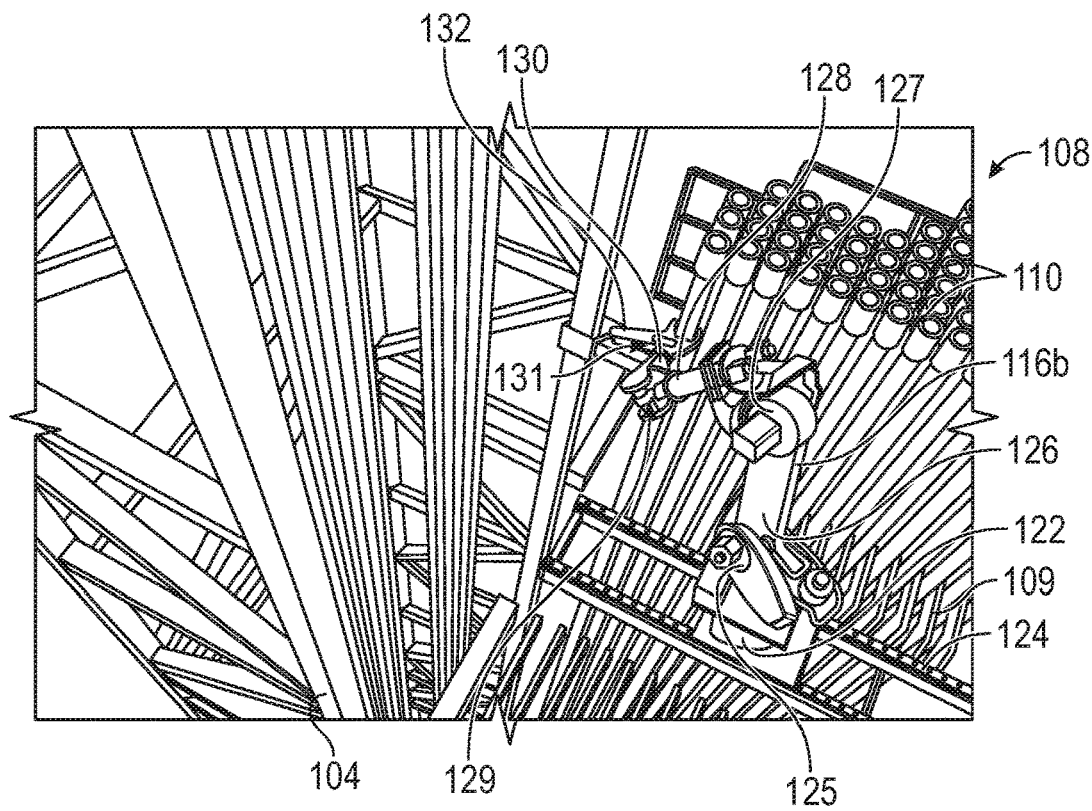
FIG. 5A is a perspective view of a pipe handling robot of the present disclosure arranged on a racking board, according to one or more embodiments.
Figure 5B:
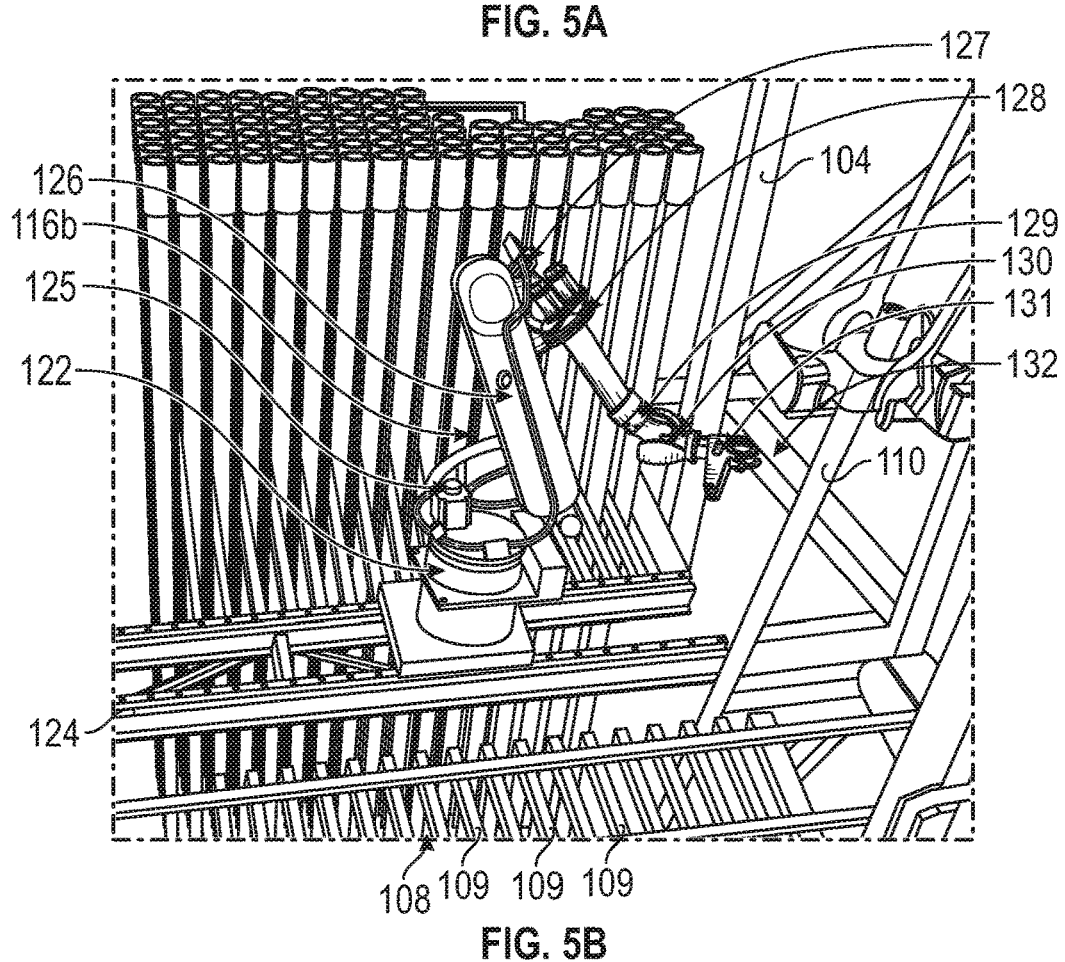
FIG. 5B is another side view of the pipe handling robot of FIG. 5A, according to one or more embodiments.

FIG. 4 shows an embodiment of a robot 116a arranged on the drill floor 102, according to one or more embodiments. The drill floor robot 116a may be configured for handling a first end of pipe stands 110, the first end being an end positioned closest the drill floor 102 when the pipe stands are arranged within the racking board 108. In some embodiments, the first end of the pipe stand 110 may be referred to as a lower end. FIG. 5 shows an embodiment of a robot 116b arranged on the racking board 108, according to one or more embodiments. The racking board robot 116b may be configured for handling a second end of pipe stands 110, the second end being an end positioned closest the racking board 108 when the pipe stands are arranged within the racking board. In some embodiments, the second end of the pipe stand 110 may be referred to as an upper end. As shown in FIGS. 4 and 5, each of the robots 116 may include a base portion 122, which may be arranged on a track 124. The robots 116 may additionally each include a shoulder portion 126, an articulated arm 128, a wrist portion 130, and an end effector 132. Each robot 116 may have a reach capacity of between approximately 4 feet and approximately 20 feet, or between approximately 6 feet and approximately 15 feet, or between approximately 8 feet and approximately 10 feet. In other embodiments, each robot 116 may have any other suitable reach capacity. Moreover, each robot 116 of the present disclosure may have a load capacity at full reach of between approximately 200 pounds and approximately 900 pounds, or between approximately 300 pounds and approximately 700 pounds, or between approximately 400 pounds and approximately 500 pounds. In other embodiments, each robot 116 may have any other suitable load capacity at full reach.

The base portion 122 of each robot 116 may be configured to couple the robot to the drill floor 102, racking board 108, or another suitable location on the drilling rig 100. In some embodiments, the base portion 122 may additionally be configured to facilitate movement of the robot 116 on the drill floor 102, racking board 108, or other surface of the drill rig 100. For example, the base portion 122 may be configured to engage with a track 124 or rail, as shown in FIGS. 4 and 5. The base portion 122 may have skids or rollers configured for sliding engagement with the track 124. The track 124 may provide a first axis of movement. In some embodiments, the track 124 may provide a second axis of movement, such that the base portion 122 may move in both an X-direction and a Y-direction. In some embodiments, the track 124 may be positioned so as to be centrally arranged with respect to stored pipe stands 110. For example, where pipe stands 110 are stored on two sides of a racking board 108 and/or setback area 105, the track 124 may be centrally aligned between the two sides, such that the robot may readily access pipe stands stored on both sides of the racking board and/or setback area. In particular, the track 124 may be arranged between a driller's side and an off-driller's side of the setback area 105, and may provide an axis of movement extending between the well center and an edge of the drill floor. The track 124 may have a length of between approximately 1 foot and approximately 20 feet, or between approximately 2 feet and approximately 15 feet, or between approximately 3 feet and approximately 10 feet. In at least one embodiment, the track 124 may have a length of approximately 13 feet. In some embodiments, the track 124 of either or both robots 116 may have a length equal to or slightly larger or slightly smaller than a length of the racking board 108. In some embodiments, the robots 116 may have tracks 124 of equal length and configuration, while in other embodiments an upper robot 116*b* may have a track with a different length and/or different configuration than that of a lower robot.

It is to be appreciated that in other embodiments, the base portion 122 may have other movement means for moving the robot 116 along a drill floor 102, racking board 108, or other surface. For example, the base portion 122 may have wheels or treads or may be configured with a walking mechanism. In still other embodiments, other movement means are contemplated as well.

Each robot 116 may have a shoulder portion 126 extending from the base portion 122. The shoulder portion may couple to the base portion via a joint 125, which may be a swivel joint in some embodiments. The swivel joint 125 may allow the shoulder portion 126 to twist or rotate about a central axis with respect to the base portion 122. In some embodiments, the shoulder portion 126 may be configured to twist up to 360 degrees, up to 270 degrees, up to 180 degrees, up to 90 degrees, up to 45 degrees, or up to a different suitable degree of rotation. In other embodiments, the shoulder portion 126 may couple to the base portion 122 with a different joint, or the shoulder may couple to the base portion without a joint. The shoulder portion 126 may extend generally upward from the base portion 122, and in some embodiments, may extend upward at an angle, such that a longitudinal axis of the shoulder portion may be offset from a longitudinal axis of the base portion by approximately 10, 15, 20, 25, 30, 35, 40, 45 degrees, or any other suitable degree of offset. The shoulder portion 126 may have a length of between approximately 12 inches and approximately 100 inches, or between approximately 18 inches and approximately 75 inches, or between approximately 24 inches and approximately 60 inches.

The articulated arm 128 may extend from the shoulder portion 126. In particular, where the shoulder portion 126 couples at a first, or proximal, end to the base portion 122, the articulated arm 128 may extend from a second, or distal, end of the shoulder portion. A joint or elbow 127, which may be a pitch joint, may be arranged between the articulated arm 128 and the shoulder portion 126. The pitch joint 127 may allow the articulated arm 128 to pivot with respect to the shoulder portion 126 about an axis extending lateral to the shoulder portion and articulated arm. In some embodiments, the pitch joint 127 may allow the articulated arm 128 to pivot within a range of up to 360 degrees, up to 270 degrees, up to 180 degrees, up to 90 degrees, up to 45 degrees, or up to any other suitable degree of rotation. In other embodiments, the articulated arm 128 may couple to the shoulder portion 126 via a different joint or without a jointed connection. The articulated arm may have a length of between approximately 20 inches and approximately 100 inches, or between approximately 28 inches and approximately 75 inches, or between approximately 35 inches and approximately 50 inches.

The wrist portion 130 may extend from the articulated arm 128. For example, where the articulated arm 128 couples at a first, or proximal, end to the shoulder portion 126, the wrist 130 may extend from a second, or distal, end of the articulated arm. A joint 129 may be arranged between the wrist portion 130 and the articulated arm 128 and may provide for pivotable or rotational movement of the wrist with respect to the articulated arm about one or more axes. The joint 129 may be or include a pitch joint allowing for pivotable movement about a first lateral axis extending lateral to the articulated arm 128 and wrist 130, a yaw joint allowing for pivotable movement about a second lateral axis perpendicular to the first lateral axis, and/or a roll joint allowing for pivotable or rotational movement about an axis extending longitudinally through the wrist portion. The wrist portion 130 may have pivotable or rotational movement about each axis within a range of up to 360 degrees, up to 270 degrees, up to 180 degrees, up to 90 degrees, up to 45 degrees, or up to any other suitable degree of rotation. In other embodiments, the wrist portion 130 may couple to the articulated arm 128 via a different joint or without a jointed connection. The wrist 130 may be configured to provide a mechanical interface or mounting point for coupling an end effector 132 to the robot 116. In some embodiments, a joint 131, such as a pitch, yaw, and/or roll joint, may allow for pivotable movement of the end effector with respect to the wrist portion.

Figure 6:
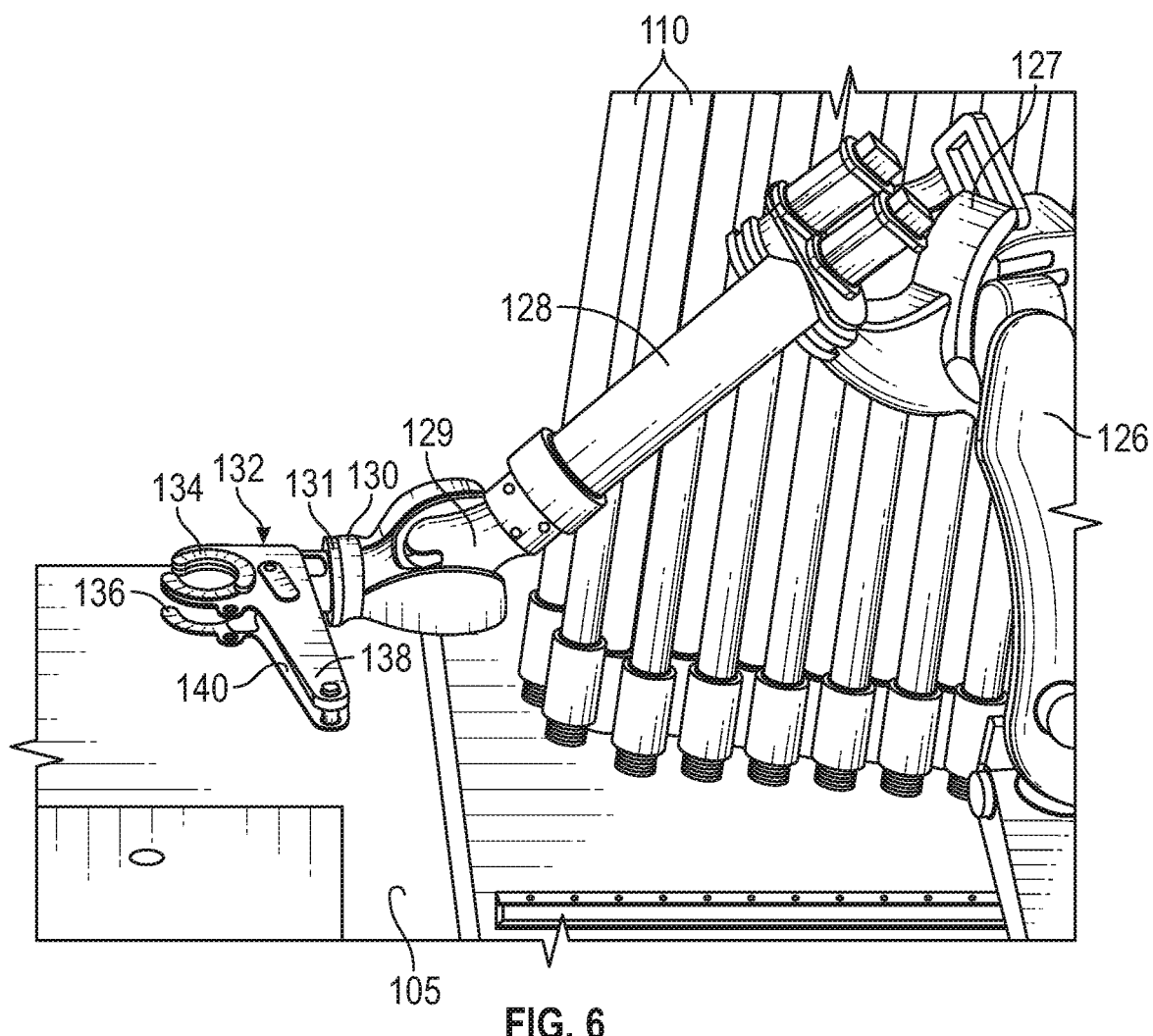
FIG. 6 is a close-up view of an end effector of a pipe handling robot of the present disclosure, according to one or more embodiments.

The end effector 132 may extend from the wrist portion 130 and may be configured to provide an operational or tooling hand for various operations performed by the robot 116. For example, in some embodiments, the end effector 132 may include a movable claw or gripper configured for grasping objects. FIG. 6 shows a close-up view of an end effector 132. The end effector 132 may be configured for handling lengths or stands of drill pipe, drill collar, and/or other piping. While a particular type of end effector is shown, a variety of different types of end effectors may be provided. For example, the end effectors shown and described in International Patent Application No. PCT/US2019/044976 entitled End Effectors for Automated Pipe Handling, filed on Aug. 2, 2019, the content of which is hereby incorporated by reference herein in its entirety, may be provided. Still other end effectors and end effector disconnects may be provided such as those shown and described in U.S. Provisional Application No. 63/019,366, entitled Passive Rotation Disconnect, and filed on May 3, 2020, the content of which is hereby incorporated by reference herein in its entirety.

In one or more embodiments, the end effectors may include fingers 134, 136 that may each have a curved shape with an inner contour sized and configured to receive a pipe stand. Inner contours of the two fingers 134, 136 may have a same radius of curvature for receiving a same pipe size or range of pipe sizes. The two fingers 134, 136 may be arranged such that their inner contours curve toward one another to form a closed or substantially closed loop. In one ore more embodiments, the fingers may be offset longitudinally along the length of the pipe such that rotation of the end effector may cause the fingers to straddle the pipe and allow for releasing the pipe.

In some embodiments, the fingers 134, 136 may be sized and shaped to receive a particular pipe diameter or a particular range of pipe diameters. In some embodiments, the end effector 132 may have a coating on one or more surfaces to facilitate handling operations. For example, the end effector 132 may have a low-friction coating arranged on an inner contour surface of the movable finger and/or fixed finger. A low-friction coating may include wearable fluoro-plastic or another relatively low-friction metallic alloy having a static coefficient of friction against pipe steel of less than 0.2, for example. Other relatively low-friction coatings or materials may be used as well. Such a low-friction coating may facilitate sliding engagement of the end effector with a pipe, for example. In this way, a pipe section may be free to rotate, pivot, and/or move longitudinally while engaged by the end effector. In other embodiments, the end effector 132 may have a high-friction coating or surface to facilitate gripping operations. Other coatings may be used as well.

In one or more embodiments, the end effectors may include a mechanical interface between the end effector and the wrist portion that may allow the end effector to be readily removed by an operator. For example, the mechanical interface may include a threaded connection, clamped connection, a ball and plunger mechanism, and/or any other suitable connection or mechanism allowing for the end effector to be disconnected from the wrist portion on demand. In this way, an operator may remove and replace the end effector as needed. For example, in one or more embodiments, the passive rotation disconnect system of U.S. Provisional Patent Application No. 63/019,366 may be provided.

In some embodiments, the end effector 132 may have one or more sensors or feedback devices. For example, a proximity sensor or other electromagnetic sensor may be arranged on or about the claw for detecting a presence of a pipe or other object positioned within the claw. Additionally or alternatively, a contact switch or other position sensor may be arranged on or about the claw for detecting an open or closed position of the movable finger 136. Each robot 116 may have other sensors and/or feedback devices, such as torque feedback devices, proximity sensors, position sensors, and/or other devices or sensors configured to indicate other movements or conditions.

In some embodiments, the pipe handling system may have one or more controllers, each configured for controlling one or more components of the pipe handling system. For example, each of the lifting system, iron roughneck, drill floor robot, and racking board robot may have a controller controlling operations thereof. In one or more embodiments, a single controller of subset of controllers may be used rather than a controller for each component. Each controller may be in wired or wireless communication with one or more associated components of the handling system. For example, a controller may be associated with at least one robot 116 and may be encoded with instructions for controlling a position of the robot on the track 124, a position of the shoulder portion 126, a position of the articulated arm 128, a position of the wrist 130, a position of the end effector 132, and/or a position of the movable finger 136 or other movable component(s) of the end effector. The controller may additionally be configured to receive feedback from one or more feedback devices or sensors. In some embodiments, the controller may be configured to respond to received feedback or sensor information by, for example, making one or more position adjustments of the robot 116.

As described in more detail below with respect to particular methods of operation, a pipe handling system of the present disclosure, or components thereof, may be configured to operate as a coordinated system. For example, two robots, such as an upper robot and a lower robot, may operate together to manipulate a single pipe stand, with the upper robot manipulating an upper end of the pipe stand and the lower robot manipulating a lower end of the pipe stand. Movements of the two robots may be coordinated such that the two robots may operate as a team. The two robots may additionally operate in conjunction with operation of a lifting system to handle the load of the pipe stand and to raise/lower the pipe stand as needed to facilitate operations. An iron roughneck may additionally be operated in conjunction with the robots and/or lifting system to perform coordinated operations.

Having described the system as a whole, particular operational features may be described. That is, it is to be appreciated that each robot 116 may have a plurality of movable components and/or a plurality of movement axes with respect to each movable component. In some embodiments, each movable component and/or each axis of movement may be independently controllable and may be configured for coordinated movement with another robot or system. In some embodiments, one or more components or axes of movement may be actively controlled during a pipe handling operation. That is, the controller may be configured to actively control a position of the end effector 132, wrist portion 130, articulated arm 128, and/or other components of the robot(s). In some embodiments, one or both robot end effectors 132 may be actively controlled during a pipe handling operation. In particular, a position and angle of the end effector 132 at joint 131 may be controlled to maintain a vector extending perpendicularly between the end effector fingers in parallel or near-parallel alignment with the pipe stand. This may help ensure that the end effector 132 can smoothly grab onto and release the pipe stand and avoid longitudinal loading of the end effector and robot. Additionally, this may help to reduce excess torsion or other loads on the robots themselves.

Figure 7:
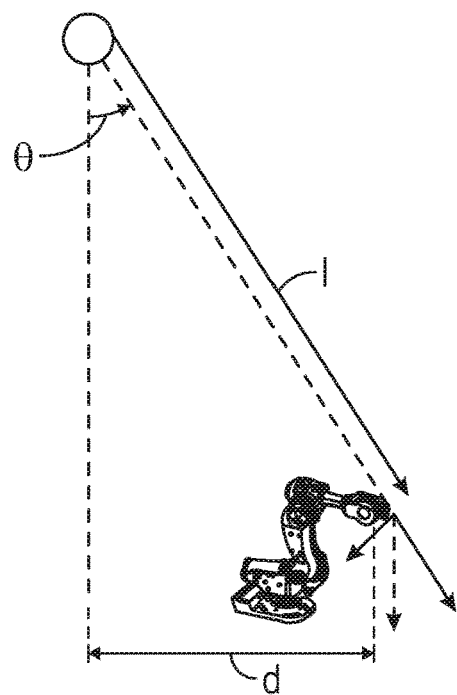
FIG. 7 is a geometrical diagram of an inclined pipe or pipe stand, according to one or more embodiments.
Figure 8:
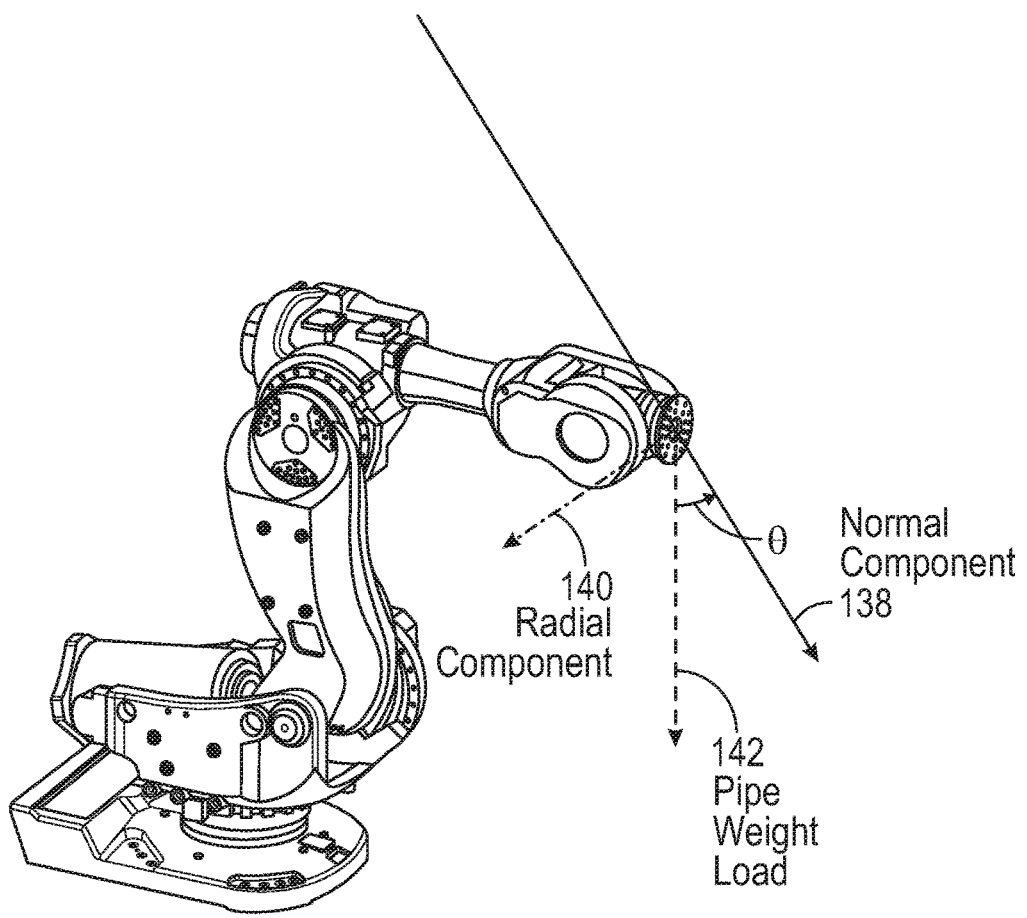
FIG. 8 is a load diagram of the inclined pipe or pipe stand, according to one or more embodiments.

Further to the idea of avoiding longitudinal loading of the end effector, reference to FIGS. 7 and 8 may be made. As shown, racking or unracking pipe or pipe stands during tripping operations may provide for relatively small angles relative to plumb. That is, in FIG. 7, where the length "l" is quite large (i.e., on the order of about 20-150 ft, or more commonly about 60-90 ft), and the distance "d" is relatively small (i.e., on the order of 10-30 ft, or more commonly about 15 ft), the angle relative to plumb "θ" may remain quite small as well. For example, where the setback area is 15 feet or so from well center and the pipe stands are 90 ft long, the angle relative to plumb or vertical might not generally exceed about 10 degrees. As shown in FIG. 8, the forces on the end effector stemming from the pipe or pipe stand weight (i.e., pipe weight load 142) and due to the pipe or pipe stand being out of plumb may be broken down into a normal component 138 and a radial component 140. Since the angle from plumb is relatively small, the radial component 140 of the pipe weight load 142 remains relatively small. Moreover, where the end effector is positioned to avoid resisting the normal component 138 of the pipe weight load 142, relatively little load may be imparted on the end effector and, thus, the robot. This may allow for smaller and more efficient robots and components making for a more efficient robotic operation.

As mentioned, positioning the end effector to avoid resisting the normal component of the pipe weight load may involve maintaining a vector extending perpendicularly between the end effector fingers in parallel or near-parallel alignment with the pipe stand. Several approaches to this vector alignment may be provided. For example, the location and position of the end effectors on the upper and lower robots may be tracked and the end effectors may be controlled to maintain the vector of each end effector parallel (e.g., knowing that a generally straight pipe is extending between the two end effectors). Still other approaches to maintaining vector alignment may be provided. For example, a center point approach may be used where the support point of the pipe stand defines a center of a sphere and the end effector position may define a radius of the sphere and, thus, the spherical surface. The end effector may be maintained in tangential relationship with the spherical surface. One difficulty with this approach is that the distance between the support point and the end effector may change, requiring a varying definition of the spherical surface. Another approach may be to use mono or stereo vision or a lidar type line detector to capture pipe geometry and maintain a z-axis or normal vector in alignment with the pipe based on externally captured information about the pipe position and orientation.

Figure 9:
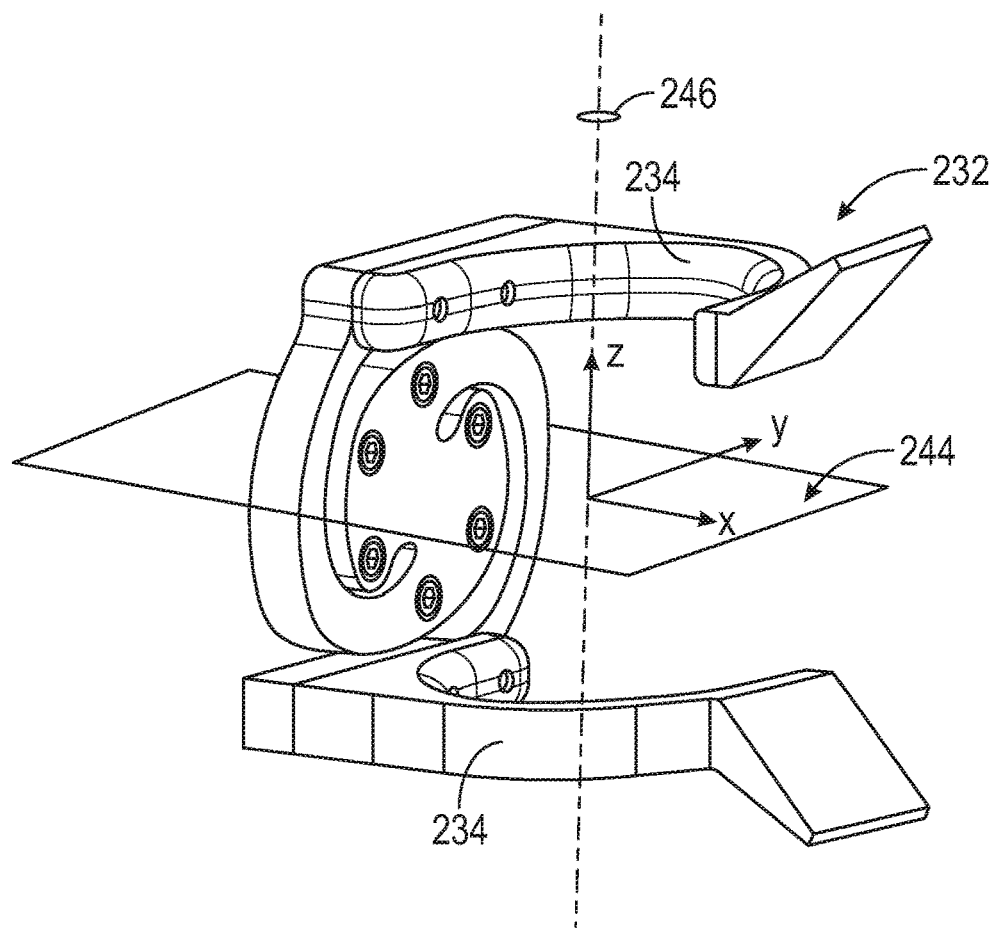
FIG. 9 is a close-up view of an end effector showing a working plant and a longitudinal vector, according to one or more embodiments.

In one or more embodiments, maintaining vector alignment may be provided using a vector constraint. As shown in FIG. 9, the end effector 232 may include a local axis including an x-y coordinate system that defines the working plane 244 of the end effector 232. That is, fingers 234 of the end effector 232 may lie in the x-y plane or, as shown in FIG. 9, the fingers 234 may be offset longitudinally and may lie in respective planes parallel to the x-y plane or working plane 244. In either case, the plane or planes of the fingers, hoop, claw, or other pipe lateral restraint may have a central longitudinal axis 246 that extends substantially perpendicular to the working plane 244. For purposes of limiting the longitudinal forces on the end effector 232, it may be desirable to maintain the central longitudinal axis 246 aligned and/or parallel with the longitudinal axis of a pipe or pipe stand that is being handled and a vector constraint may be provided for this purpose.

Figure 10:
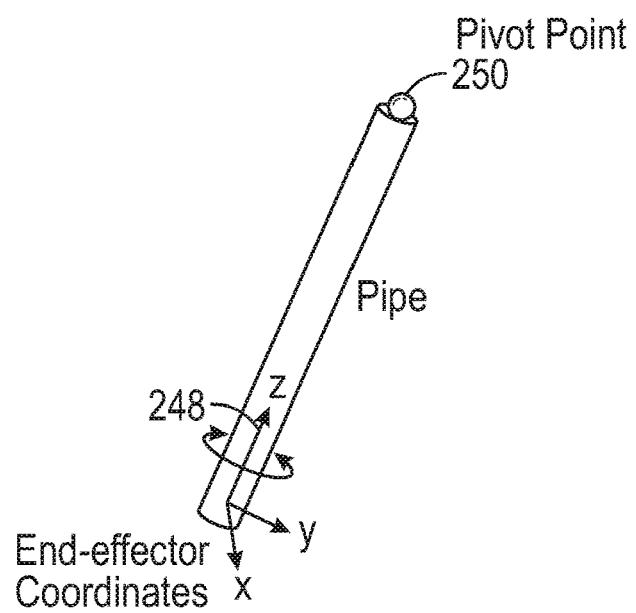
FIG. 10 is a pendulum diagram showing a left-swung pipe or pipe stand, according to one or more embodiments.
Figure 11:
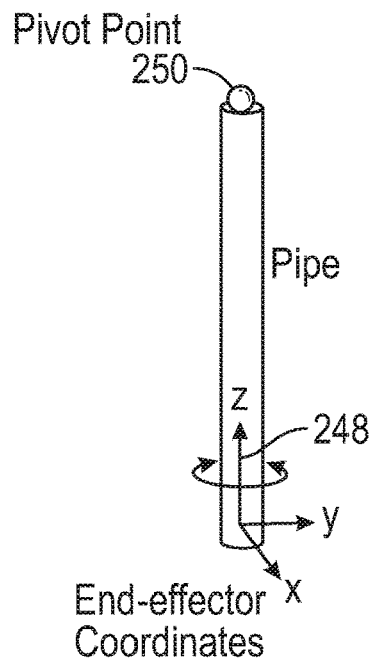
FIG. 11 is a pendulum diagram showing a generally vertical pipe or pipe stand, according to one or more embodiments.
Figure 12:
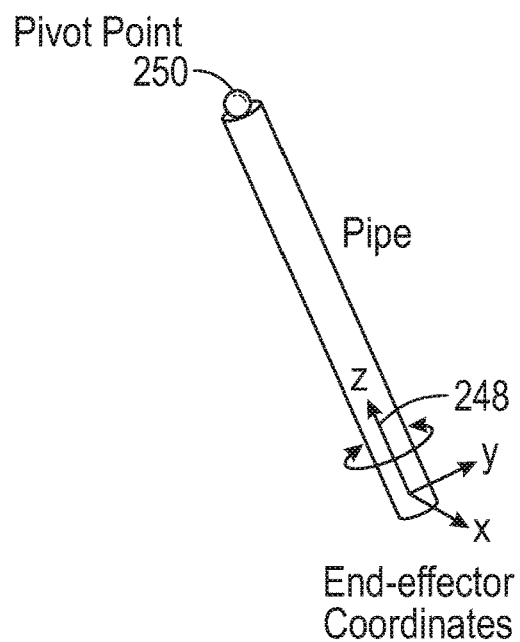
FIG. 12 is a pendulum diagram showing a right-swung pipe or pipe stand, according to one or more embodiments.

The vector constraint may be described with respect to FIGS. 10-12. For example, and given the substantially pendulum-like nature of pipe tripping operations, the vector constraint may involve constraining the z-axis. In particular, as shown, the z-axis vector 248 of the local coordinate axis of a bottom end effector 232 may be constrained to remain directed toward a known pivot point 250 at or near the top end of the pipe or pipe stand. As shown in FIG. 10, the pipe or pipe stand may be positioned in a left-swung position relative to an otherwise plumb pipe or pipe stand. As the pipe or pipe stand swings down to a plumb position about the pivot point, FIG. 11 shows that the local z-axis vector 248 of the end effector 232 continues to be directed through the pivot point 250. As the pipe or pipe stand swings further and toward a right-swung position relative to an otherwise plumb position, the z-axis vector 248 maintains its direction through the pivot point 250 as shown in FIG. 12. By maintaining the z-axis vector 248 directed through the pivot point 250, the working plane 244 of the end effector 232 may remain substantially perpendicular to the pipe or pipe stand allowing the end effector 232 to avoid resisting or picking up the normal component 138 of the pipe weight load 142.

The system may maintain the local z-axis vector 248 directed through the pivot point 250 based on system information available through the overall pipe handling operation. For purposes of discussion, the global coordinates may include a series of global axes having an origin at well center and on the drill floor. A global X axis may be arranged to pass through well center and extend parallel to the drill floor through the setback area substantially bisecting the setback area. A global Y axis may be arranged to pass through well center and extend parallel to the drill floor, perpendicular to the X axis, and along the setback areas. A global Z axis may be arranged to pass through well center in a vertical fashion substantially perpendicular to the drill floor and along the drill string, for example.

The overall pipe handling operation may include sensors and information allowing for global coordinates of the several stationary and/or operating elements of the system to be monitored and tracked. For example, the height of the travelling block, the top drive, and/or the top drive elevator may be monitored and data on the height above the drill floor or other reference plane or point may be maintained on an ongoing basis. While these elements may be assumed to be located generally directly above well center, further sensor or systems may be provided for identifying variance from well center along the X or Y axis, or both, and measuring or accounting for such variance. In the case of swinging a bottom end of the pipe to or from well center, the pivot point 250 of the pipe may be, for example, at the center of the top drive elevator or other pipe carrying elevator and at the height of the elevator. In one or more embodiments, the pivot point 250 may be a stationary pivot point such as when the top drive elevator maintains its position while the bottom of the pipe is swung from well center to a setback area or vice versa. Alternatively or additionally, the pivot point may be a moving pivot point. In any case, the relative position of the end effector 232 of the bottom robot may be monitored. At any given position of the end effector 232 at any given point in time or at any point along the tailing path, the relative position of the end effector 232 and the pivot point 250 may be determined based on the global coordinate system and an angle relative to the Z axis in either the X axis direction, the Y axis direction, or both may be calculated. The end effector 232 may be rotated to the calculated angle unless/until the local z-axis vector 248 (and, thus, the central longitudinal axis 246) of the end effector 232 is aligned along the calculated angle and/or directed at the pivot point 250. While a global cartesian coordinate system has been described, a polar coordinate system, or other coordinate system may be used.

In the case of moving a top portion of the pipe, a different pivot point 250 may be used. For example, in one or more embodiments, moving the top end of the pipe between the top drive elevator and the racking board may involve setting the pipe or pipe stand on the drill floor and using the racking board robot to move the top end of the pipe. In this situation, the pivot point 250 may include the position of the bottom end of the pipe on the drill floor. As such, the position of the end effector 232 on the racking board robot relative to the pivot point may be determined and an angle relative to the global Z-axis along the X-axis, the Y-axis, or both may be determined. The local z-axis vector 248 (and, thus, the central longitudinal axis 246) of the end effector 232 may be rotated to the calculated angle unless/until the local z-axis vector 248 of the end effector 232 is aligned along the calculated angle and/or directed at the pivot point 250. Tolerances may be provided for the alignment of the z-axis vector extending through the pivot point, which may allow for a more flexible or a more stringent vector constraint.

In one or more embodiments, pipe vision technologies such as mono or stereo vision cameras or lidar type line detectors may be used in conjunction with the vector constraint described above. That is, for example, pipe bow, warpage, or other factors may cause the pipe to not be perfectly aligned between the lifting point and the end effector. In these situations, adjustments to the end effector orientation may be made where the pipe vision technology indicates that the longitudinal axis of the pipe at the end effector location is not perfectly aligned with the support points. In still further embodiments, a physics engine may be provided to assist with modeling the pipe sag, for example. A dynamics model of the system robot itself may also allow for a live torque measurement providing for estimates of the external force applied at the end effector. A dedicated transducer may be provided at the end effector or at the quick disconnect of the end effector to the robot. With these tools, the robot may be controlled with a goal of reducing or minimizing the external force applied to the end effector using a force feedback loop, for example. This way, a feed forward control signal may be generated by the planned path and then a force feedback control signal may compensate or enhance the performance of the end effector during robot motion.

Figure 13A:
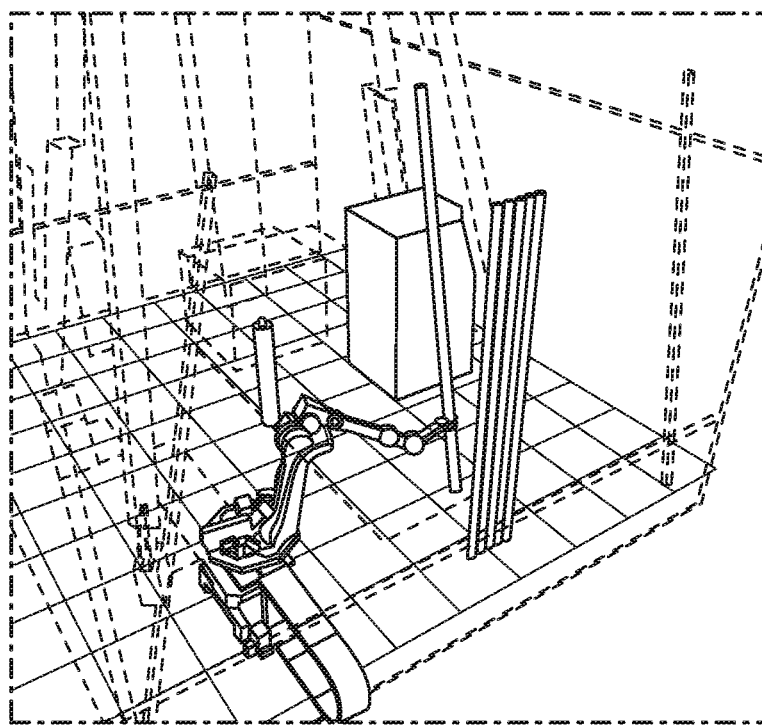
FIG. 13A is a perspective view of a pipe tripping operation with a suspended pipe bottom being moved from a setback area to well center, according to one or more embodiments.
Figure 13B:
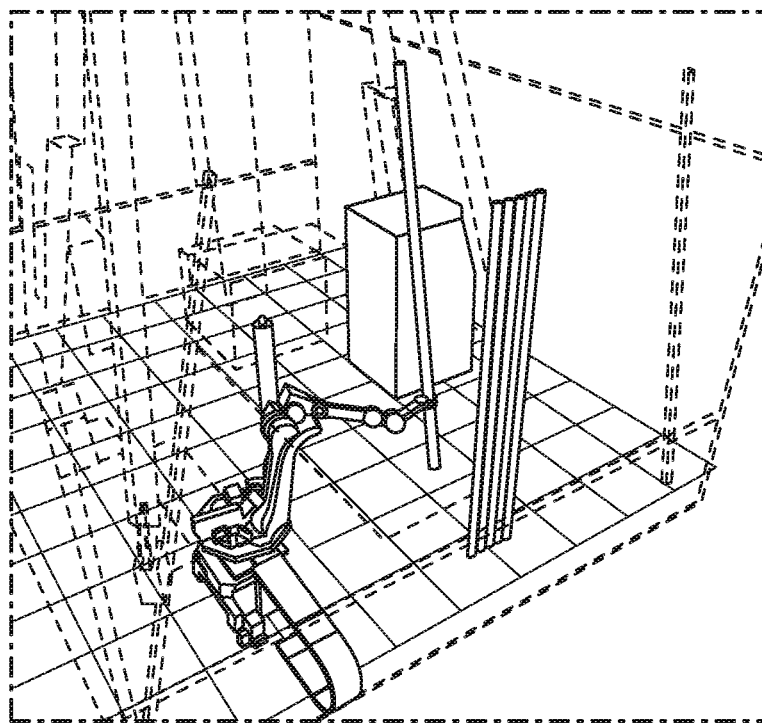
FIG. 13B is a perspective view like FIG. 13A with the pipe swung away from the setback area toward well center, according to one or more embodiments.
Figure 13C:
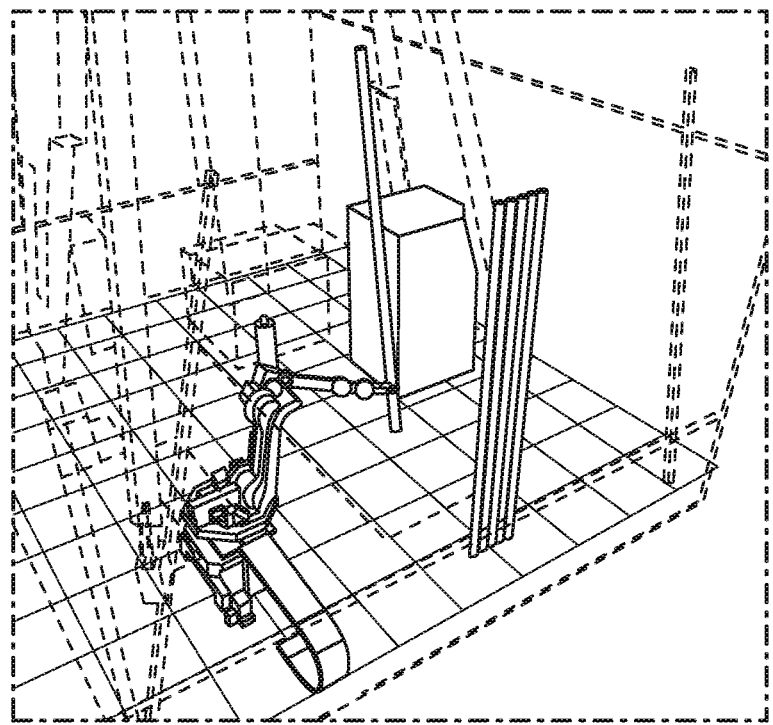
FIG. 13C is a perspective view like FIGS. 13A-B with the pipe swung further away from the setback area toward well center, according to one or more embodiments.
Figure 13D:
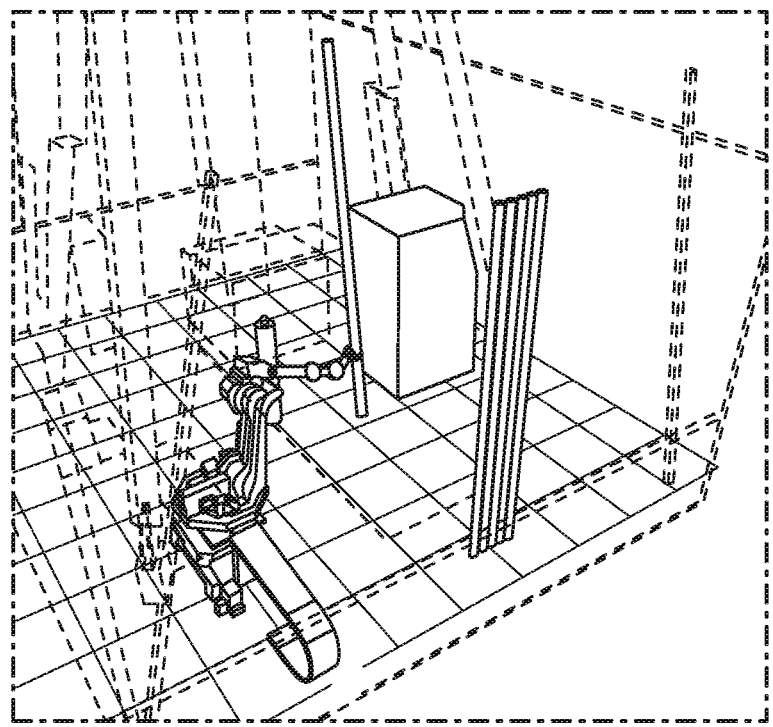
FIG. 13D is a perspective view like FIGS. 13A-C with the pipe swung still further away from the setback area toward well center, according to one or more embodiments.
Figure 13E:
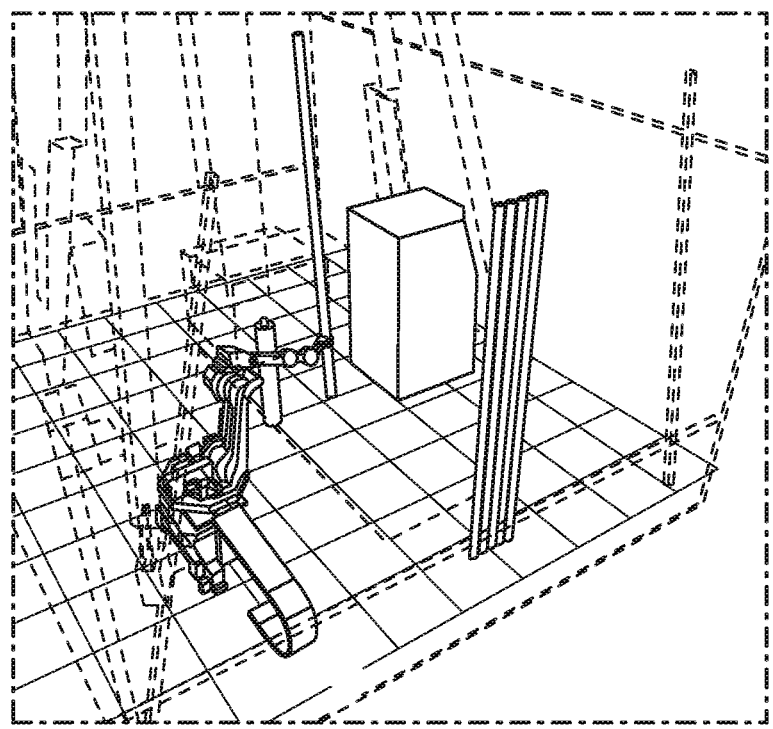
FIG. 13E is a perspective view like FIGS. 13A-D with the pipe swung even still further away from the setback area toward well center, according to one or more embodiments.
Figure 13F:
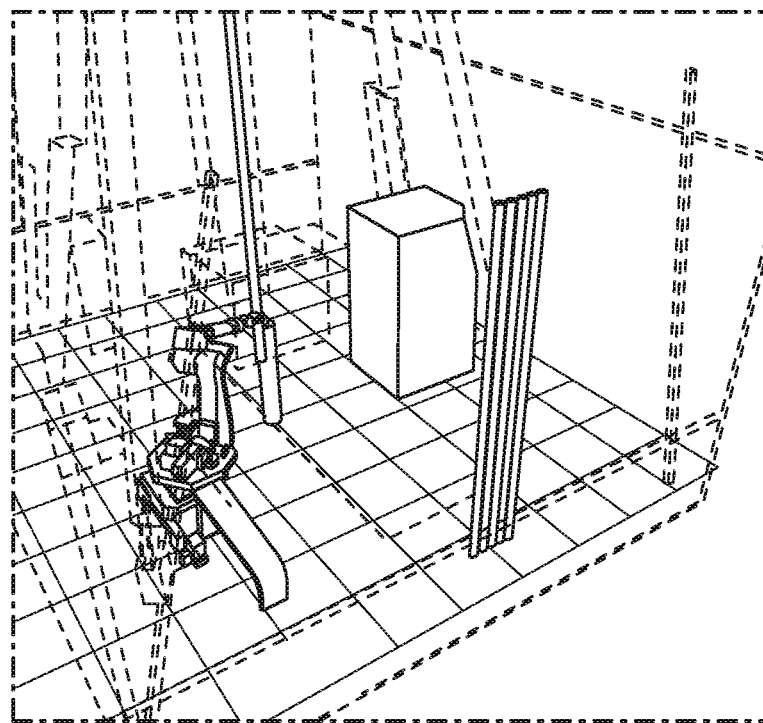
FIG. 13F is a perspective view like FIGS. 13A-E with the pipe arriving at well center, according to one or more embodiments.
Figure 14:
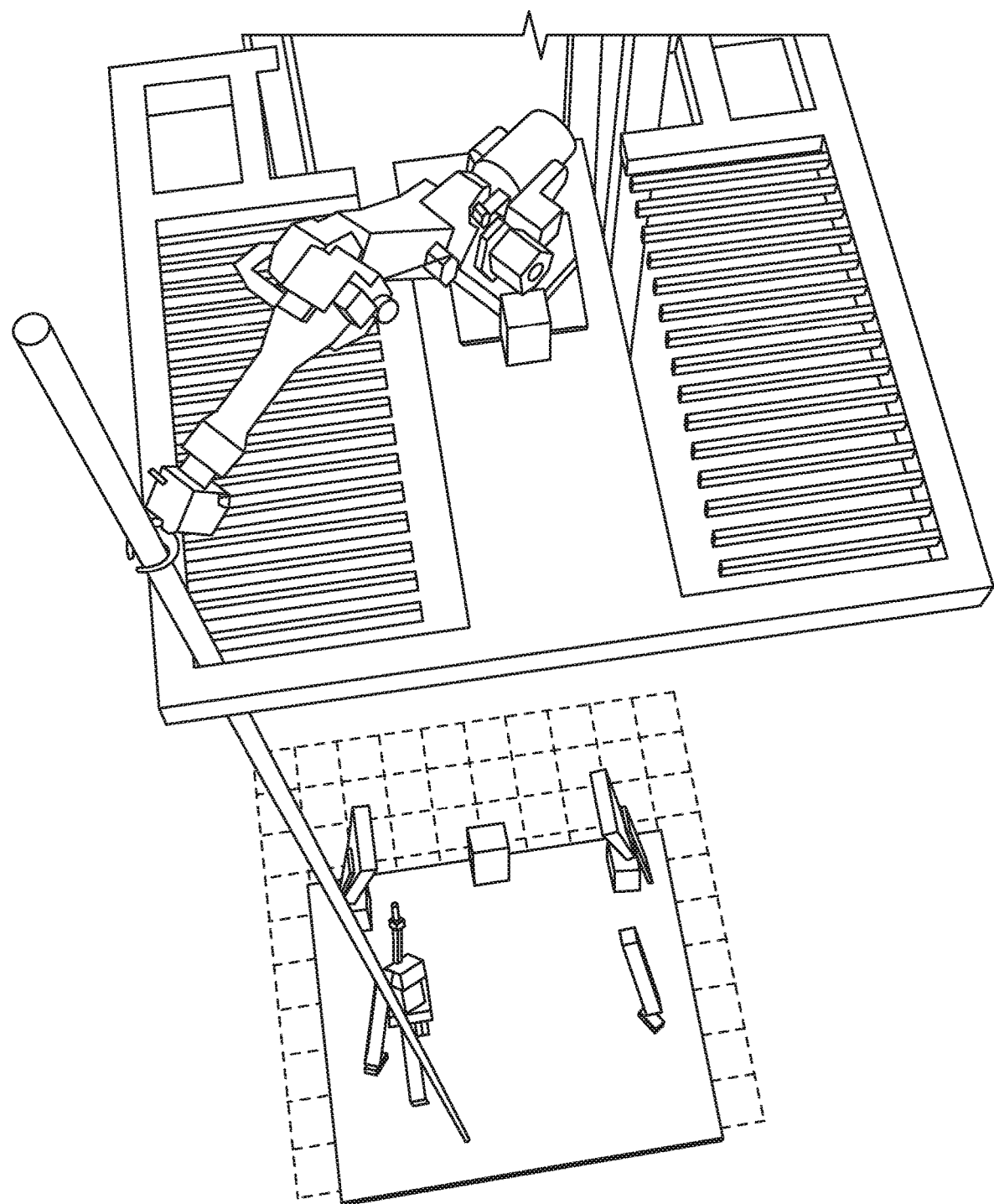
FIG. 14 is a perspective view of a pipe tripping operation with a bottom supported pipe having its top end guided to or from the racking board, according to one or more embodiments.
Figure 15:
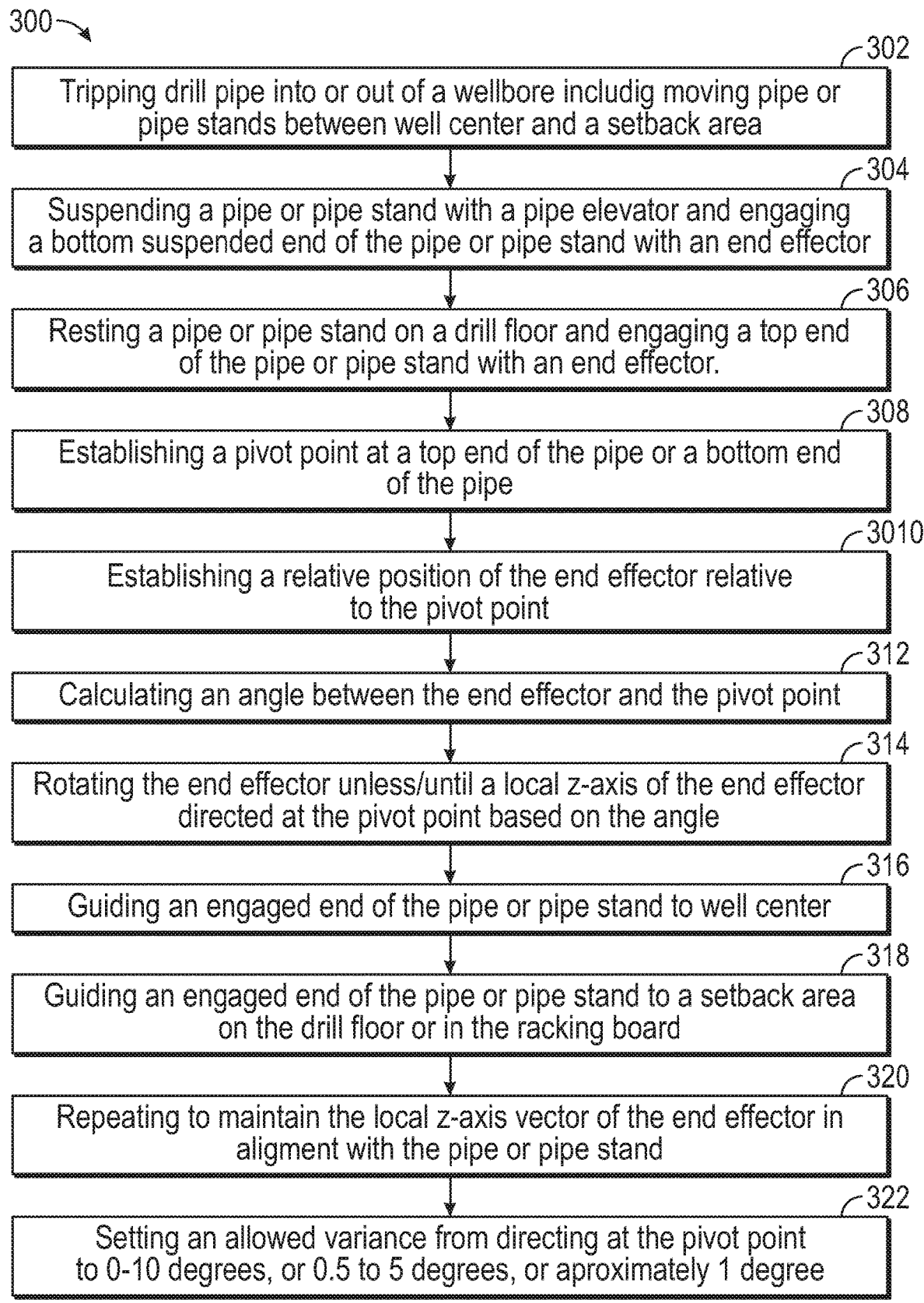
FIG. 15 is a method diagram showing a method of tripping pipe including controlling an end effector using a vector constraint.

In operation and use, a method of handling a pipe or pipe stand with a drill floor robot (300) may be provided as shown in FIG. 15. That is, the method may include tripping drill pipe into or out of a wellbore and, as such, may include moving pipe or pipe stands between well center and a setback area. (302) A pipe handling system may rely on a top drive elevator or other elevator or the drill floor for carrying the weight of the pipe or pipe stands and may use one or more robots to cause a top end or a bottom end of the pipe or pipe stand to move between well center and the setback area. As shown in FIG. 13A, the method may include suspending a pipe or pipe stand with a pipe elevator and engaging a bottom suspended end of the pipe or pipe stand with an end effector. (304) Additionally or alternatively, the method may include resting a pipe or pipe stand on a drill floor and engaging a top end of the pipe or pipe stand with an end effector. (306) The method may include establishing a pivot point at a top end of the pipe or a bottom end of the pipe. (308) That is, when the pipe is suspended, a pivot point may be at or near a suspending pipe elevator and when the pipe is rested on the drill floor, the pivot point may at or near the resting point. The method may also include establishing a relative position of the end effector relative to the pivot point. (310) The method may also include calculating an angle between the end effector and the pivot point. (312) The method may also include rotating the end effector unless/until a local z-axis of the end effector directed at the pivot point based on the angle. (314) As shown in the series of FIGS. 13B-13F, the method may include guiding an engaged end of the pipe or pipe stand to well center. (316) Alternatively or additionally, the method may include guiding an engaged end of the pipe or pipe stand to a setback area on the drill floor or in the racking board. For example, as shown in FIG. 14, the top end of the pipe may be guided between the fingers of the racking board. In one or more embodiments and as the pipe or pipe stand end is guided by the robot, the steps of establishing a relative position, calculating an angle, and rotating the end effector may be repeated to maintain the local z-axis vector of the end effector in alignment with the pipe or pipe stand. (320) In one or more embodiments, an allowed variance from directing at the pivot point may be set to a relatively small value such as 0-10 degrees, or 0.5 to 5 degrees, or approximately 1 degree. (322) As such, the system may establish a local z-axis constraint by repeating the above process and maintain the z-axis pointing at the pivot point within 1 degree, for example.

The devices, systems, and methods described herein provide for improved the efficiency of pipe handling operations relative to conventional operations without excessive costs for robust pipe carrying robots, for example. Moreover, in some embodiments, the lifting system may be or include components of the primary drill line and draw works of the drilling rig, without the need to introduce a secondary lifting device or mechanism. However, in other embodiments, a secondary lifting system, device, or mechanism may be used.

For example, in some embodiments, a lifting system of the present disclosure may include a secondary or auxiliary line or cable extending from a draw works. The auxiliary line may operate in addition to the primary or main drill line to facilitate pipe handling operations. In some embodiments, the lifting system may include a dual activity top drive having the ability to engage with a pipe stand with a first elevator while engaging with the drill string with a second elevator, as described in U.S. Provisional Application No. 62/809,093, entitled Dual Activity Top Drive, and filed Feb. 22, 2019, the content of which is hereby incorporated by reference herein in its entirety. In some embodiments, the lifting system may include a robotic drill floor lifting system, which may be or be similar to systems described in U.S. patent application Ser. No. 16/375,927, entitled System for Handling Tubulars on a Rig, and filed Apr. 5, 2019, the content of which is hereby incorporated by reference herein in its entirety. Additionally or alternatively, the lifting system may include an auxiliary lifting arm extending from the drill floor, mast, racking board, or another suitable location on the drilling rig. The lifting arm may be configured for holding a pipe stand above the drill floor while the pipe stand is manipulated by one or pipe handling robots. The lifting arm may be hydraulically or pneumatically actuated in some embodiments. The lifting arm may have a claw or elevator for coupling to or engaging with the pipe stand. In some embodiments, pipe handling operations of the present disclosure may incorporate a first lifting system for handling drill pipe and a second lifting system for handling drill collar.

In some embodiments, one or more robots of the present disclosure may be or include commercially available or off-the-shelf components. For example, one or more pipe handling robots may be or include any of the following: YASKAWA MH225, KAWASAKI BX200, ABB IRB 6620-205, ABB IRB 6700/6790. Other suitable robots and robot components may be used as well.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be

What is claimed is:

1. A pipe handling system for handling drill pipe, the system comprising:
 a lifting system configured for handling a load of a pipe stand;
 a pipe handling robot configured for manipulating a position of the pipe stand and having an end effector configured for engaging the pipe stand wherein, the end effector defines a working plane, a local longitudinal axis extends perpendicular to the working plane, and the local longitudinal axis defines a longitudinal vector; and
 a controller configured for controlling the pipe handling robot to maintain the end effector in substantial alignment with the pipe stand using a vector constraint on the longitudinal vector.

2. The system of claim 1, wherein the controller is configured to implement the constraint on the longitudinal vector by maintaining the longitudinal vector substantially parallel to the pipe stand.

3. The system of claim 2, wherein:
 the controller is configured to establish a pivot point; and
 maintaining the longitudinal vector substantially parallel to the pipe stand comprises maintaining an orientation of the longitudinal vector such that the longitudinal vector is directed substantially at the pivot point.

4. The system of claim 3, wherein directed substantially at the pivot point comprises being directed within 0.5 degrees to 5 degrees of the pivot point.

5. The system of claim 4, wherein directed substantially at the pivot point comprises being directed within 1 degree of the pivot point.

6. The system of claim 1, wherein the controller is configured to establish a pivot point at a pipe carrying elevator or on the drill floor.

7. A pipe handling robot, comprising:
 a plurality of moveable components including an end effector configured for engaging a pipe stand, the end effector defining a working plane and a local longitudinal axis that extends perpendicular to the working plane and the local longitudinal axis defining a longitudinal vector; and
 a controller configured for controlling the pipe handling robot to maintain the end effector in substantial alignment with the pipe stand using a vector constraint on the longitudinal vector by maintaining the longitudinal vector substantially parallel to the pipe stand.

8. The robot of claim 7, wherein:
 the controller is configured to establish a pivot point; and
 maintaining the longitudinal vector substantially parallel to the pipe stand comprises maintaining an orientation of the longitudinal vector such that the longitudinal vector is directed substantially at the pivot point.

9. The robot of claim 8, wherein directed substantially at the pivot point comprises being directed within 1 degree of the pivot point.

10. A method of tripping pipe, comprising:
 supporting drill pipe by suspending the drill pipe at a first top end with an elevator or resting the drill pipe at a first bottom end on the drill floor;
 with an end effector of a robot, engaging the drill pipe at a second end opposite the first top end or the first bottom end, the end effector defining a working plane and a longitudinal axis perpendicular to the working plane, the longitudinal axis defining a longitudinal vector,
 controlling the robot to move the second end to or from well center from or to a setback area, respectively, while using a vector constraint on the longitudinal vector to maintain the longitudinal vector of the end effector substantially parallel to the drill pipe.

11. The method of claim 10, further comprising establishing a pivot point at the first bottom end or the first top end.

12. The method of claim 11, wherein using a vector constraint to maintain the longitudinal vector substantially parallel to the drill pipe comprises orienting the end effector to direct the longitudinal vector substantially at the pivot point.

13. The method of claim 12, further comprising calculating the relative position of the end effector and the pivot point, wherein orienting the end effector is based on the relative position.

14. The method of claim 13, further comprising calculating an angle between the end effector and the pivot point and aligning the longitudinal vector based on the angle.

15. The method of claim 12, wherein substantially at the pivot point comprises being directed within 1 degree of the pivot point.

* * * * *